(12) United States Patent
Levy et al.

(10) Patent No.: US 11,301,868 B2
(45) Date of Patent: Apr. 12, 2022

(54) METHOD FOR PREDICTIVE ANALYTICS FOR FINDING RELATED ARRAY ENTRIES

(71) Applicant: B7 INTERACTIVE, LLC, San Antonio, TX (US)

(72) Inventors: Kenneth L. Levy, Stevenson, WA (US); Neil E. Lofgren, White Salmon, WA (US)

(73) Assignee: B7 Interactive, LLC, San Antonio, TX (US)

( * ) Notice: Subject to any disclaimer, the term of this patent is extended or adjusted under 35 U.S.C. 154(b) by 148 days.

(21) Appl. No.: 16/252,355

(22) Filed: Jan. 18, 2019

(65) Prior Publication Data

US 2019/0213598 A1    Jul. 11, 2019

Related U.S. Application Data

(60) Division of application No. 13/492,859, filed on Jun. 9, 2012, now Pat. No. 10,269,021, which is a continuation-in-part of application No. 13/107,858, filed on May 13, 2011, and a continuation-in-part of
(Continued)

(51) Int. Cl.
  *G06Q 30/00* (2012.01)
  *G06Q 30/06* (2012.01)

(52) U.S. Cl.
  CPC ......... *G06Q 30/00* (2013.01); *G06Q 30/0601* (2013.01); *G06Q 30/0603* (2013.01); *G06Q 30/0623* (2013.01); *G06Q 30/0629* (2013.01); *G06Q 30/0631* (2013.01); *G06Q 30/0635* (2013.01); *G06Q 30/0641* (2013.01)

(58) Field of Classification Search
  CPC .................. G06Q 30/0601–0645; G06Q 30/08

USPC ................................................ 705/26.1–27.2
See application file for complete search history.

(56) References Cited

U.S. PATENT DOCUMENTS

| 6,064,980 A | 5/2000 | Jacobi et al. |
| 6,266,649 B1 | 7/2001 | Linden et al. |
| 6,317,722 B1 | 11/2001 | Jacobi et al. |

(Continued)

OTHER PUBLICATIONS

Linden et al., "Amazon.com Recommendations", 2003, IEEE Computer Society, accessed at [https://www.cs.umd.edu/~samir/498/Amazon-Recommendations.pdf] (Year: 2003).*

(Continued)

*Primary Examiner* — Michael Misiaszek
*Assistant Examiner* — Lindsey B Smith
(74) *Attorney, Agent, or Firm* — Trop, Pruner & Hu, P.C.

(57) ABSTRACT

This invention deals with a computer-implemented method for using predictive analytics to find a second set of entries in a first array that are related to a first set of entries in the first array without directly calculating entry-to-entry similarities between entries in the first array, the method including: (a) identifying a target entry in a second array, wherein the first set of entries in the first array are linked to the target entry in the second array; (b) finding likely entries in the second array that have similarities to a target entry in the second array using a correlation; (c) finding linked entries in the first array that are linked to the likely entries found in the second array; and (d) using the linked entries found in the first array as the second set of entries in the first array.

11 Claims, 10 Drawing Sheets

Figure 1A:
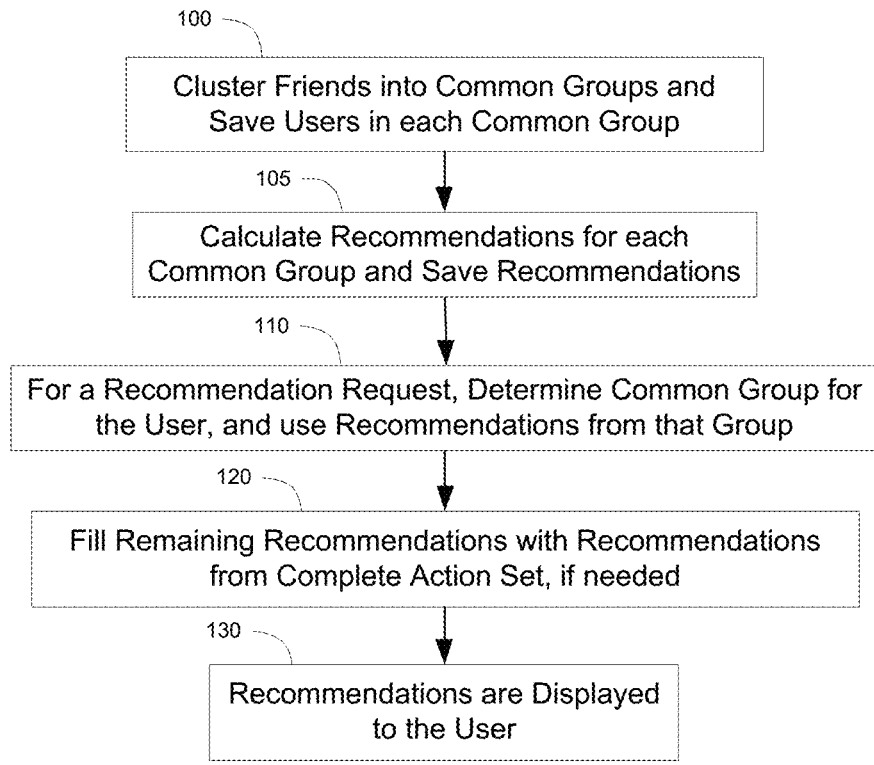

Related U.S. Application Data application No. 12/764,091, filed on Apr. 20, 2010, now abandoned.

(60) Provisional application No. 61/610,090, filed on Mar. 13, 2012, provisional application No. 61/599,428, filed on Feb. 16, 2012, provisional application No. 61/549,244, filed on Oct. 20, 2011, provisional application No. 61/495,381, filed on Jun. 10, 2011, provisional application No. 61/334,185, filed on May 13, 2010, provisional application No. 61/236,882, filed on Aug. 26, 2009, provisional application No. 61/229,617, filed on Jul. 29, 2009, provisional application No. 61/224,914, filed on Jul. 13, 2009, provisional application No. 61/179,074, filed on May 18, 2009, provisional application No. 61/171,055, filed on Apr. 20, 2009.

(56) References Cited

U.S. PATENT DOCUMENTS

| | | | |
|---|---|---|---|
| 6,412,012 | B1 | 6/2002 | Bieganski |
| 6,567,814 | B1 | 5/2003 | Bankier et al. |
| 6,757,682 | B1 | 6/2004 | Naimark et al. |
| 6,782,370 | B1 | 8/2004 | Stack |
| 6,853,982 | B2 | 2/2005 | Smith et al. |
| 6,912,505 | B2 | 6/2005 | Linden et al. |
| 7,113,917 | B2 | 9/2006 | Jacobi et al. |
| 7,403,910 | B1 | 7/2008 | Hastings et al. |
| 7,474,987 | B2 | 1/2009 | Subrahmanian et al. |
| 7,546,295 | B2 | 6/2009 | Brave et al. |
| 7,580,930 | B2 | 8/2009 | Brave et al. |
| 7,668,821 | B1 * | 2/2010 | Donsbach ............ G06F 16/9535 707/765 |
| 7,693,836 | B2 | 4/2010 | Brave et al. |
| 7,698,270 | B2 | 4/2010 | Brave et al. |
| 7,702,690 | B2 | 4/2010 | Brave et al. |
| 7,836,051 | B1 | 11/2010 | Mason |
| 8,260,656 | B1 * | 9/2012 | Harbick ............ G06F 16/24578 705/7.31 |
| 8,380,583 | B1 * | 2/2013 | Chanda ............... G06Q 30/0255 705/26.7 |
| 8,418,915 | B1 | 4/2013 | Miller |
| 8,429,026 | B1 | 4/2013 | Kolawa |
| 8,660,912 | B1 | 2/2014 | Dandekar |
| 2002/0010625 | A1 | 1/2002 | Smith et al. |
| 2002/0109718 | A1 | 8/2002 | Mansour et al. |
| 2004/0054572 | A1 | 3/2004 | Oldale et al. |
| 2004/0064438 | A1 | 4/2004 | Kostoff |
| 2005/0071251 | A1 | 3/2005 | Linden et al. |
| 2005/0222987 | A1 | 10/2005 | Vadon |
| 2005/0256756 | A1 | 11/2005 | Lam et al. |
| 2006/0179414 | A1 | 8/2006 | Martin et al. |
| 2006/0184558 | A1 | 8/2006 | Martin et al. |
| 2006/0259344 | A1 | 11/2006 | Patel et al. |
| 2007/0203790 | A1 * | 8/2007 | Torrens ................... G06F 16/24 705/14.69 |
| 2008/0004989 | A1 | 1/2008 | Yi |
| 2008/0133601 | A1 | 6/2008 | Martin et al. |
| 2008/0134043 | A1 | 6/2008 | Georgis et al. |
| 2008/0243632 | A1 | 10/2008 | Kane et al. |
| 2009/0063304 | A1 | 3/2009 | Meggs |
| 2009/0210246 | A1 | 8/2009 | Patel et al. |
| 2009/0248495 | A1 | 10/2009 | Hueter et al. |
| 2009/0299767 | A1 | 12/2009 | Michon |
| 2010/0049663 | A1 | 2/2010 | Kane et al. |
| 2010/0191582 | A1 * | 7/2010 | Dicker ............... G06Q 30/0633 705/14.51 |
| 2010/0250336 | A1 | 9/2010 | Selinger et al. |
| 2010/0268661 | A1 | 10/2010 | Levy et al. |
| 2010/0280920 | A1 * | 11/2010 | Scott ...................... G06Q 30/00 |
| 2010/0299298 | A1 | 11/2010 | Osmond |
| 2011/0282821 | A1 | 11/2011 | Levy et al. |
| 2012/0117072 | A1 | 5/2012 | Gokturk et al. |
| 2012/0316986 | A1 | 12/2012 | Levy et al. |
| 2014/0172627 | A1 | 6/2014 | Levy et al. |
| 2014/0220516 | A1 | 8/2014 | Marshall et al. |

OTHER PUBLICATIONS

Magento Inc., "Configuring Product Promotions—Cross-Sells", http://www.magentocommerce.com/knowledge-base/entry/configuring-product-promotions-cross-selling, Apr. 19, 2010.

Magento Inc., "Configuring Product Promotions—Related Products", http://www.magentocommerce.com/knowledge-base/entry/configuring-product-promotions-related-, Apr. 19, 2010.

Volusion, Inc., "Related Products", http://supportvolusion.com/article/related-products, Apr. 19, 2010.

Chris Pearson, "Amazon: Customers Who Bought Related Items Also Bought", http://thenoisychannel.com/2009/01/31/amazon-customers-who-bought-related-items-also-bought/, Jan. 31 to Feb. 2, 2009.

Slope One, http://en.wikipedia.org/wiki/Slope_One, Aug. 6, 2007.

Hack Netflix Prize, http://dmnewbie.blogspot.com/2007/09/greater-collaborative-filtering.html, Feb. 5, 2009.

Robert M. Bell and Yehuda Koren, "Improved Neighborhood-based Collaborative Filtering", ACM KDDCup'07, Aug. 12, 2007, San Jose, California, USA.

Robert M. Bell, Yehuda Koren and Chris Volinsky, "Modeling Relationships at Multiple Scales to Improve Accuracy of Large Recommender Systems", ACM KDD'07, Aug. 12-15, 2007, San Jose, California, USA.

Robert M. Bell, Yehuda Koren and Chris Volinsky, The BellKor solution to the Netflix Prize , Netflixprize.com, Nov. 22, 2007.

Simon Funk (a.k.a. Brandyn Webb), Blog Posts: "Netflix Challenge", http://sifter.org/-simon/journal/20061027 2.html, Oct. 27, 2006, "Netflix Update: Try This at Home", http:f/sifter.org/-simon/journal/20061211.html, Dec. 11, 2006 D "Netflix SVD Derivation", http://sifter.org/-simon/journal/20070815.html, Aug. 15, 2007.

"Netflix Prize", http://www.timelydevelopment.com/demos/NetflixPrize.aspx, Sep. 17, 2008.

"There is evil there that does not sleep; the Great Eye is ever watchful", http://pragmatictheory.blogspot.com/2008/10/there-is-evil-there-that-does-not-sleep.html, Oct. 14, 2008.

John Moe, "My modifications", http://www.johnmoe.com/svd.html, Aug. 6, 2007.

"White Paper: eMarketing Suite GB", Avail Intelligence AB, Apr. 19, 2010.

Monahan, John, et al., "An Actuarial Model of Violence Risk Assessment for Persons With Mental Disorders", Jul. 2005, Psychiatric Services, http://ps.psychiatryonline.org, Jul. 2005 vol. 56 No. 7, pp. 810-815 (Year: 2005).

Schafer, J. Ben, Joseph A. Konstan, and John Riedl. "E-commerce recommendation applications." Data mining and knowledge discovery5. 1-2 (2001): 115-153. (Year: 2001).

Das, Abhinandan S., et al. "Google news personalization: scalable on line collaborative filtering." Proceedings of the 16th international conference on World Wide Web. ACM, 2007. (Year: 2007).

United States Patent Office, Final Office Action dated Aug. 3, 2021 in U.S. Appl. No. 16/365,669 (13 pages).

\* cited by examiner

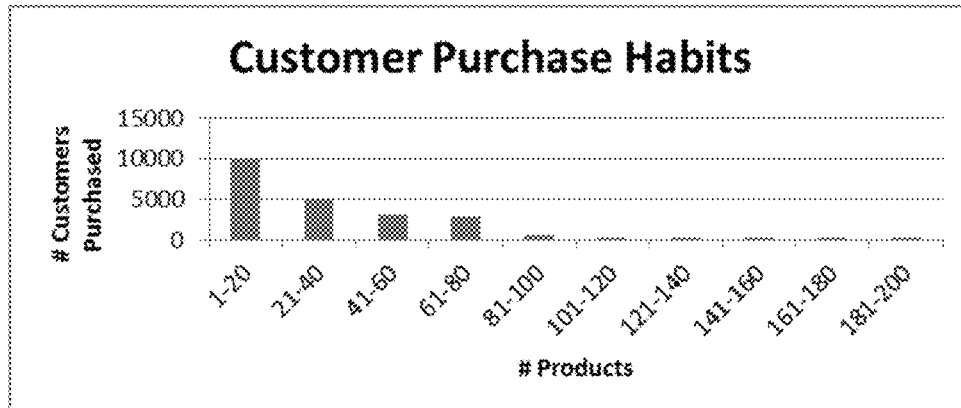
Fig.7A
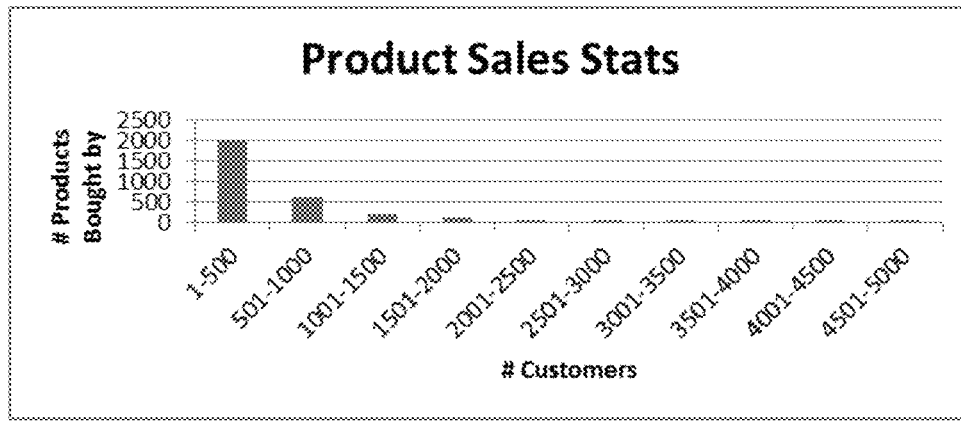
Fig.7B
Customer Purchase Habits
21,900 total customers with 98,171 total sales
1,025 customers bought more than ten products
20,875 customers bought ten or fewer products
The ratio is 0.05
Product Sales Stats
3,012 products in catalog with 98,171 total sales
1,008 products were bought by more than ten customers
2,004 products were bought by ten or fewer customers
The ratio is 0.50
Fig. 7C

METHOD FOR PREDICTIVE ANALYTICS FOR FINDING RELATED ARRAY ENTRIES

CROSS-REFERENCE TO RELATED APPLICATIONS

This application is a divisional of U.S. patent application Ser. No. 13/492,859 filed Jun. 9, 2012 (published as US 2012/0316986A1) (Docket No. 4Tell013R) entitled "More Improvements in Recommendation Systems" which is incorporated by reference and which claims the benefit of Provisional Patent Application Ser. No. 61/495,381 filed Jun. 10, 2011, Ser. No. 61/549,244 filed Oct. 20, 2011, Ser. No. 61/599,428 filed Feb. 16, 2012, and Ser. No. 61/610,090 filed Mar. 13, 2012, all of which are incorporated by reference. Said application Ser. No. 13/492,859 is a Continuation-in-Part of U.S. patent application Ser. No. 13/107,858 filed May 13, 2011 (published as US2011/0282821A1) (Docket No. 4Tell008R) entitled "Further Improvements in Recommendation Systems" which is incorporated by reference and which claims the benefit of Provisional Patent Application Ser. No. 61/334,185 filed May 13, 2010 which is incorporated by reference. Said application Ser. No. 13/492,859 is also a Continuation-in-Part of U.S. patent application Ser. No. 12/764,091 filed Apr. 20, 2010 (published as US2010/0268661A1) (Docket No. 4Tell006R) entitled "Improvements in Recommendation Systems" which is incorporated by reference and which claims the benefit of Provisional Patent Application Ser. No. 61/171,055 filed Apr. 20, 2009, Ser. No. 61/179,074 filed May 18, 2009, Ser. No. 61/224,914 filed Jul. 13, 2009, Ser. No. 61/229,617 filed Jul. 29, 2009, and Ser. No. 61/236,882 filed Aug. 26, 2009, all of which are incorporated by reference. This application claims the benefit of U.S. patent application Ser. No. 14/133,818 filed Dec. 19, 2013 (published as US2014/0172627) (Docket No. 4Tell017R) entitled "Next Generation Improvements in Recommendation Systems" which is incorporated by reference and which claims the benefit of Provisional Patent Application Ser. No. 61/739,124 filed Dec. 19, 2012, and Ser. No. 61/806,331 filed Mar. 28, 2013, both of which are incorporated by reference.

TECHNICAL FIELD OF INVENTION

The present invention relates to recommendation systems, data mining, and knowledge discovery in databases.

BACKGROUND OF THE INVENTION

Recommendation systems have two parts, generator and recommendation engine. The generator creates the recommendations. It lists N, usually 20, recommended items (or users) for each target item (user). It can be manual entry, but is usually an automated system using correlation, Bayesian, or neural networks to relate items based upon user actions. The recommendation engine receives requests for recommendations, and returns the recommended items. The request usually includes the number of desired recommendations and type of recommendations (cross-sell, similar, or personalized).

There are numerous examples including patent application Ser. No. 12/764,091 entitled "Improvements in Recommendations Systems" by Ken Levy and Neil Lofgren, and patent application Ser. No. 13/107,858 entitled "Further Improvements in Recommendation Systems" by Ken Levy and Neil Lofgren, both incorporated herein by reference.

When working in social media, there are new problems, such as how to use social graphs to improve recommendations. Or, determine who will buy a product, especially a new product. It is not ideal to have your complete ecommerce store on a social media commerce site. In addition, if generating recommendations based upon the actions of friends, the system becomes extremely complex since the recommendations for each product have to be calculated for each user.

In addition, previously mentioned application Ser. No. 13/107,858 discusses using similarity measurements that are used in recommendations can be used to automate web analytics. The input is view data for URLs, and can include purchase data for products. These results can show which URLs, such as a video, lead to the purchase of a product (i.e. are related to the purchase of the product).

Furthermore, there are difficulties using recommendations in email, display boards, with new products, such as on flash sales sites, and using recently viewed items to dynamically update recommendations as a shopper browses a website.

SUMMARY OF THE INVENTION

This patent application traverses the numerous limitations discussed in the background.

Social recommendations can be created by using actions limited to your friends, rather than the complete action set. This improves recommendations because friends provide more relevant data. The computational complexity problem of having different results for each user is solved with either clustering or real-time filtering. In the clustering system, the friends are clustered into common groups, recommendations are created for each group using existing recommendation systems, and the resulting recommendations are selected from the group that the user is a member. The other aspects of generation and recommendation engine are unchanged. In the real-time filtering system, the recommendations are generated as usual. The social graph, i.e. list of friends for each user, is determined, optionally saved with the recommendation database to increases speed. Then, the recommendation results are filtered to make sure that a friend has acted upon the recommendations in some fashion, such as bought, viewed, rated, reviewed or recommended the product. If not enough recommendations have been acted upon by a friend, the non-acted upon recommendations are used to fill the remaining results.

Promotion add-ons increase sales by adding cross-sell recommendations to a promotion. In addition, if a user and their friends buy a promoted item and cross-sell item, they can receive a larger combined discount.

The relationship of products, and customers and products is displayed using pie charts, drop lists and graphs. This includes customer purchase habits, which shows the number of customers that purchased a specific number or range of products. It also includes the product sales stats, which shows the number of products bought by a number or range of customers. The solution can also show which customers are likely to buy a specific product.

Automated analytics are focused on relating which web pages are viewed together or which web pages are viewed before buying an item. The view data can be combined with the traditional funnel to expand the understanding of user's behavior. This is accomplished without a person having to create a custom script or report.

Furthermore, automated web analytics can break actions on web pages into a finer grain, including view, read, and exit, where a viewed page is browsed for less than a minute, a read page is browsed for over a minute, and an exit page is the last page viewed on the site. The funnel and correlation can be performed between different types of web pages.

Similar items are items that are viewed by common users. However, these items should share an attribute and remove the effect of items that are purchased together.

Genomic recommendations are cross-sell items that are related via attributes that are bought together. If the attribute is too specific, i.e. has too few items, the parent attribute is used to calculate the genomic recommendations.

Campaign optimization, defined as determining which items to promote and to whom to promote each item, is important. It means that a company can promote more products, but not annoy users with constant bombardment of promotional materials (i.e. emails) because each promotion is sent to a focused user set. The top promoted items are determined by multiplying a value for an item, like price, times each user likely to purchase the item, and summing across all likely users to create a promotion value. The items with the largest promotion values are best to promote. In addition, for these top items or a list created by the retailer, the users likely to purchase the items are determined using the related items for the items that the user bought.

Upsell recommendations are similar items with lower in priced recommendations moved to later in the recommendation list. The ratio of the price of the recommendation to the price of the target product is used to re-order the recommendations. An upsell factor is used, such that any item below the price of the target item times the factor (i.e. creating an upsell threshold) is moved to the end of the list or disregarded if enough items above the upsell threshold exist. An upsell factor of 1 creates recommendations that are all more expensive than the target item.

An improvement for similar items includes using the number of shared first attributes (e.g. categories) and number of actions (e.g. sales) to determine similar items. A second attribute (e.g. brand) can also be used, and the second attribute is usually 1-to-1, meaning an item only has one second attribute. The second attribute is weighted lower than the first attribute, such that if not enough similar items share both a first and second attribute, similar items are backfilled with items that share at least one first, then items that share a second attribute. Furthermore, similar items are primarily arranged by a master type, including, in order of rank, (1) viewed then ultimately bought, (2) viewed together, (3) share first and second attribute, (4) share only first attribute, (5) share only second attribute, and (6) top sellers.

Recommending items on a display board that recognizes and segments the viewer by gender and age is based upon the likelihood of an item to be bought by the viewer segment. The likelihood is calculated using the number of purchases of the item by the viewer segment during a pre-selected time period and optional time-of-day segment. In addition, the likelihood can utilize item factors including price, profit and inventory levels. The likelihood is normalized by maximums for sales or each factor during a time period and optional time-of-day segment. The items with the largest likelihoods are displayed on the board, along with cross-sell and similar recommendations for the displayed items. The likelihoods can be manipulated by a store merchandiser using business rules, such as promotion of an item, promotion of an item in a category or brand, and the effect of inventory, price and profit. Furthermore, real time analytics to determine ad effectiveness is calculated as (sales−average sales)/(normalized views) for the advertised product, where averages sales is from the same time period on a previous day when the ad is not running.

Recently viewed items affect the likelihood of purchase of recommendations. For similar items, the likelihood of purchase of items that are similar to both the currently viewed and recently viewed items are summed. For cross-sell, recently viewed items that are also a cross-sell recommendation for the currently viewed item are increased in likelihood. Furthermore, if a recently viewed item is viewed many times, its influence is reduced to show the shopper other products.

Retailers with new products use personalized recommendations to grow their business. This is especially important in flash sales where products don't exist long enough to obtain behavioral data. The first method of personalized recommendations of new products is to: (i) determine the correlation between the shopper and each product attribute, labeled input attribute (ii) determine the correlation for each product attribute with all other product attributes, labeled correlated attributes, (iii) multiply the correlations in the previous two steps for each input attribute and correlated attribute to create correlated likelihoods, (iv) sum the correlated likelihood for identical correlated attributes, and (v) the likelihood that the shopper will buy the new product is the summed correlated likelihood for the new product's attribute. If the new product has more than one attribute, the average of correlated likelihoods for all attributes of the new product are used. The second method of personalized recommendations for new products is for the retailer to relate the new product to one or more previously sold products. Then, shoppers that are likely to buy the similar product(s) are likely to buy the new product. Both methods may be combined for optimal flash recommendations using average likelihoods or more complicated techniques like regression.

In an improved dynamic email tool, the image and the link contain both the information to create themselves and a unique ID for table lookup. When the image is created, it adds the redirection link to a table indexed by the unique ID. When the link is requested, if the unique ID exists in the table, the table lookup is used for the link redirect. Otherwise, the link redirect is dynamically created by the recommendation engine. It is preferred that the unique ID link to a template that also includes the client's alias and layout for the email.

In summary, the following include some of the inventive aspects of this application:

1. A method providing improved recommendations based upon friends, comprising the steps of:
   a. Clustering friends into a common group, and
   b. Generating recommendations for the actions limited to a common group,
   wherein at least one of the steps utilizes a computing device.
2. The method of claim 1 comprising the additional steps of:
   a. Responding to a request for recommendations for a user, where said common group for said user is determined and the recommendations for said determined common group are returned.
3. The method of claim 1 wherein the actions are purchases and recommendations are cross-sell.
4. The method of claim 1 wherein an input to the clustering process is friends.
5. The method of claim 1 wherein an input to the clustering process is interests.
6. A method providing improved recommendations based upon friends, comprising the steps of:
   a. generating recommendations,
   b. determining a user, and c. filtering the recommendations by actions of people related to said user,
wherein at least one of the steps utilizes a computing device.
7. The method of claim 6 comprising the additional steps of:
a. Responding to a request for recommendations with the filtered recommendations.
8. The method of claim 6 comprising the additional steps of:
a. Filling remaining recommendations with products not acted upon by said friends of said user.
9. The method of claim 6 wherein the actions are purchases.
10. The method of claim 6 wherein the people related to said user are friends of said user.
11. The method of claim 6 wherein the people related to said user are in a cluster around said user.
12. The method of claim 11 wherein said cluster is determined from friends of said user
13. The method of claim 11 wherein said cluster is determined from interests of said user including one or more from the group of likes and memberships.
14. The method of claim 6 wherein the people related to said user are in a common group with said user.
15. A method providing improved promotions, comprising the steps of:
a. Promoting a product, and
b. Suggesting a cross-sell product as part of the promotion,
wherein at least one of the steps utilizes a computing device.
16. The method of claim 15 wherein the promoted product is discounted and, if a shopper buys a cross-sell product, the discount is increased.
17. The method of claim 15 wherein the promoted product is discounted if a shopper convinces several friends to buy said promoted product, and, if a shopper buys a cross-sell product, the discount is increased.
18. A method to display customer purchase habits comprising the steps of:
a. Determining customer purchase habits as the number of customers that purchased a range of products, and
b. Displaying said customer purchase habits wherein at least one of the steps utilizes a computing device.
19. The method of claim 18 wherein the display is text describing said customer purchase habits based upon a limited range.
20. The method of claim 18 wherein the display is a chart with the range in bins along the x-axis.
21. A method to display product sales statistics comprising the steps of:
a. Determining product sales statistics as the number of products bought by a range of users,
b. Displaying said purchase habits
wherein at least one of the steps utilizes a computing device.
22. The method of claim 21 wherein the display is text describing said product sales statistics based upon a limited range.
23. The method of claim 21 wherein the display is a chart with the range in bins along the x-axis.
24. A method to create automated analytics comprising the steps of:
a. Determining web pages that are viewed by common users,
b. Determining the funnel for viewed target web page,
c. Determining the related web pages for said funnel,
wherein at least one of the steps utilizes a computing device.
25. The method of claim 24 wherein the web pages are categorized into types based upon time browsing on the site.
26. The method of claim 24 wherein the target web page is the last page viewed on the site.
27. A method to determine similar items from view data comprising the steps of:
a. Relating a target item and similar items based upon views of both items by common users,
b. Relating a target item and related items based upon purchases of both items by common users,
c. Reducing the effect of a related item that is also a similar item,
wherein at least one of the steps utilizes a computing device.
28. The method of claim 27 wherein said step (a) includes subtracting the likelihood of the related item from the similar item's likelihood.
29. The method of claim 27 wherein an additional step filters the similar items by attribute such that every similar item has at least one of the same attributes as the target item.
30. A method to improve genomic recommendations comprising the steps of:
a. Determining if there are enough actions in an attribute,
b. Using a parent attribute of said attribute if there are not enough actions,
c. Calculating the correlation between said parent attribute and other attributes,
wherein at least one of the steps utilizes a computing device.
31. A method to improve product campaign optimization comprising the steps of:
a. Determining users that are likely to act upon an item,
b. Summing the number of users times a value for the item, and
c. Promoting the item with the largest value,
wherein at least one of the steps utilizes a computing device.
32. The method of claim 31 wherein a likelihood of action for each user is multiplied by the value of the item.
33. The method of claim 31 wherein the value of the item is its price or profit.
34. The method of claim 32 wherein the value of the item is its price or profit.
35. A method to promote an existing product to existing customers comprising the steps of:
a. Determining the products each existing customer purchased and related items to each purchased item,
b. Adding the likelihood for each related item to a complete list of items where if the related item is also related to another item that the user bought, the likelihoods sum, resulting in a promotion likelihood, and
c. Grouping the customers by promotion likelihood, and
wherein at least one step utilizes a computing device.
36. The method of claim 35 wherein said grouping is sorting the customers by likelihood and promoting to the top predetermined number of customers.
37. The method of claim 35 wherein said grouping is keeping customers that have a promotion likelihood greater than a predetermined value.
38. A method to create upsell comprising the steps of:
a. Determining two or more items, labeled similar items, that are potentially bought instead of the target item, and
b. Arranging the similar items into a list ordered by a factor related to the price of each similar item, wherein at least one of the steps utilizes a computing device.

39. The method of claim 38 wherein the factor is the square of the ratio of the price of the similar item to the price of the target item.

40. The method of claim 38 wherein an upsell factor is used and similar items with a price below the upsell threshold, calculated as the upsell factor times the price of the target item, are either moved to the end of the similar item list or not included if enough similar items have a price greater than the upsell threshold.

41. A method to create similar items comprising the steps of:
    a. Determining the number of shared first attributes,
    b. Determining the number of actions, and
    c. Sorting the similar items primarily by number of shared first attributes,
    wherein at least one of the steps utilizes a computing device.

42. The method of claim 41 wherein a second attribute is also used, weighted less than said first attribute in sorting the items, and if not enough similar items share both said first attribute and said second attribute, items sharing at least one first attribute or second attribute are backfilled.

43. The method of claim 41 wherein the sorting is accomplished by multiplying the number of shared first attributes times the maximum number of actions for any item.

44. The method of claim 41 wherein the sorting is primarily arranged by a master type of similar recommendation, the master types include utilizing click stream and shared attributes, and click stream data are always arranged before shared attributes.

45. A method to recommend items on a display board comprising the steps of:
    a. Segmenting the viewer into a viewer segment,
    b. Determining the likelihood of an item to be bought by said viewer segment,
    c. Displaying said most likely item,
    wherein at least one of the steps utilizes a computing device.

46. The method of claim 45 wherein determining the likelihood of an item to be bought by said viewer segment includes calculating the percentage that the displayed item is bought by said viewer segment.

47. The method of claim 45 wherein the additional steps for determining the likelihood of an item to be recommended utilizes at least one item factor chosen from the group of inventory, price and profit.

48. The method of claim 47 wherein a store merchandiser creates business rules to weight the effect of step (b) and said item factors.

49. A method to analyze an item on a display board comprising the steps of:
    a. Determining an number of sales for said item during a time period,
    b. Determining an average number of sales for said item during a previous time period,
    c. Determining a number of normalized views of said item during a second time period
    d. Calculating (step (a)-step (b))/(step (c))
    wherein at least one of the steps utilizes a computing device.

50. The method of claim 49 wherein there is an additional initial step comprising a display board interfacing with a point of sale system to obtain sales data for at least one product.

51. The method of claim 49 wherein said normalized views is the number of unique viewers as determined by the display board.

52. The method of claim 49 in which said second time period of step (c) is said time period of step (a) plus a short delay.

53. A method to recommend items affected by recently viewed items comprising the steps of:
    a. Finding recommendations for the currently viewed item,
    b. Affecting a likelihood of purchase for the recommendations based upon the recently viewed items,
    wherein at least one of the steps utilizes a computing device.

54. The method of claim 53 wherein the recommendations are similar items and, if a recommended item is similar to both the currently viewed item and recently viewed items, the likelihood of purchase for said recommended item is summed.

55. The method of claim 53 wherein the recommendations are cross-sell items and, if a recommended item is also a recently viewed item, it's likelihood of purchase is increased.

56. The method of claim 55 wherein the likelihood of purchase is doubled with an additional 10% added.

57. The method of claim 53 wherein the effect of a recently viewed item is reduced if the recently viewed item is viewed numerous times.

58. The method of claim 53 wherein, if the recently viewed item is viewed numerous times, said effect on cross-sell recommendations that are also recently viewed items is reduced as the number of views is increased.

59. The method of claim 53 wherein, if the recently viewed item is viewed numerous times, similar recommendations for said recently viewed item have their likelihood of purchase related to the recently viewed item reduced before the likelihood is summed, if the recommendation is also a similar item for the currently viewed item.

60. A method to recommend items for a new product with at least one attribute, labeled new product attribute comprising the steps of:
    a. determining the correlation between the shopper and one or more input product attributes
    b. determining the correlation for said one or more input product attributes with other product attributes, labeled correlated attributes, and
    c. multiplying the correlations in steps (a) and (b) for each input product attribute,
    wherein at least one of the steps utilizes a computing device.

61. The method of claim 60 wherein there's an additional steps of summing the likelihood for identical correlated attributes 62. The method of claim 61 wherein if the new product has more than one attribute, the average of likelihoods for all correlated attributes that are attributes of the new product is used.

63. A method to recommend items for a new product comprising the steps of:
    a. choosing at least one other product that are similar to the new product, wherein the other product has previous actions, and
    b. determining the likelihood that a shopper will act on the other product
    wherein at least one of the steps utilizes a computing device.

64. The method of claim 63 wherein the new product is similar to more than one other products, and the likelihood that the shopper will act on the new product is the average of the likelihood that the shopper will act on the multiple similar products.
65. The method of claim 63 wherein the process also includes the steps of claim 60, and the likelihood is the average of the likelihood as determined in claim 63 and in claim 60.
66. A method providing focused promotions, comprising the steps of:
   a. Promoting a new product,
   b. Determining a similar product to said new product,
   c. Determining users likely to buy said similar product, and
   d. Sending information about said new product to said users of step (c),
   wherein at least one of the steps utilizes a computing device.
67. The method of claim 66 wherein several similar products are used, and the likely users are determined by combining the resulting likely users from each of said several similar products.
68. A method to redirect a link for a recommendation image comprising the steps of:
   a. Including a unique ID in said recommendation image name and redirection link,
   b. Adding a redirection link to a table when said recommendation image is created, and
   c. Utilizing said redirection link if said unique ID exists in said table, otherwise, creating said redirection link wherein at least one of the steps utilizes a computing device.
69. The method of claim 68 wherein said unique ID determines the layout template and client alias for the dynamic image.

BRIEF DESCRIPTIONS OF DRAWINGS

Figure 1B:
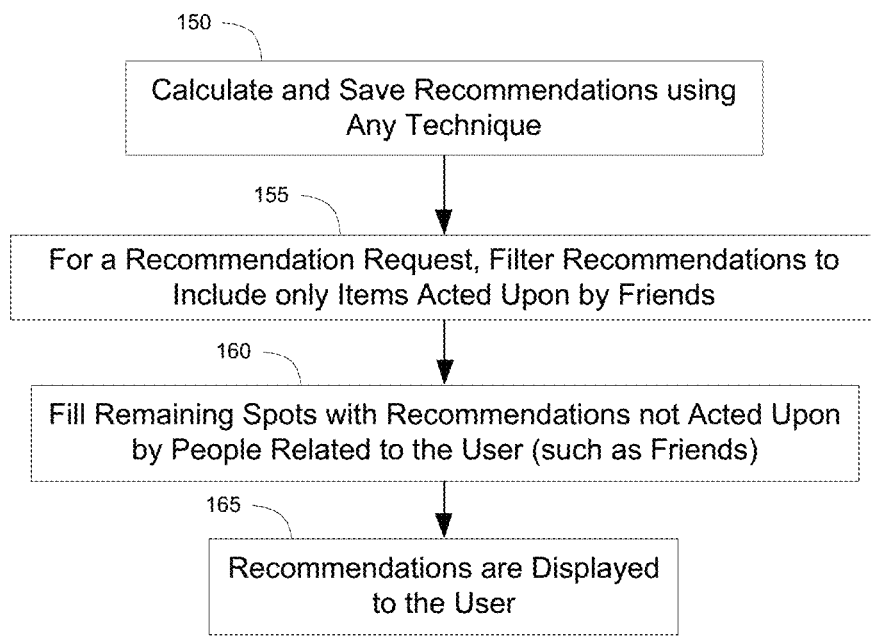
Figure 2:
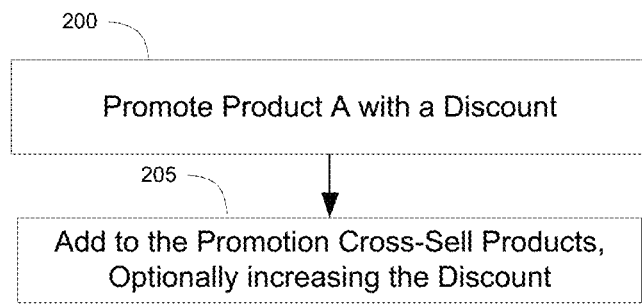
Figure 3:
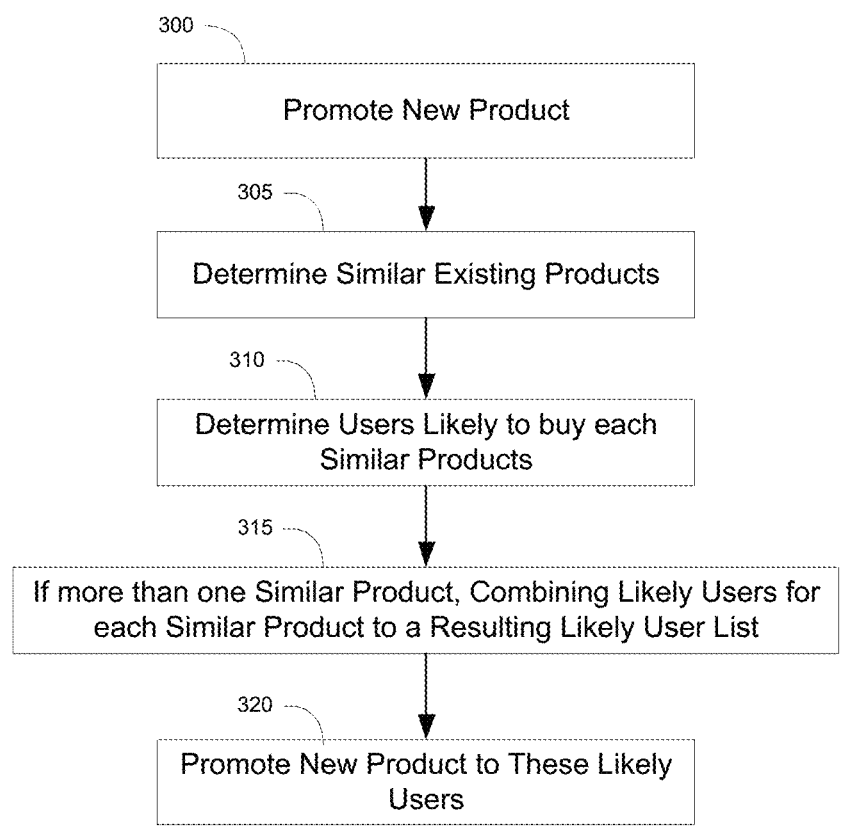
Figure 4:
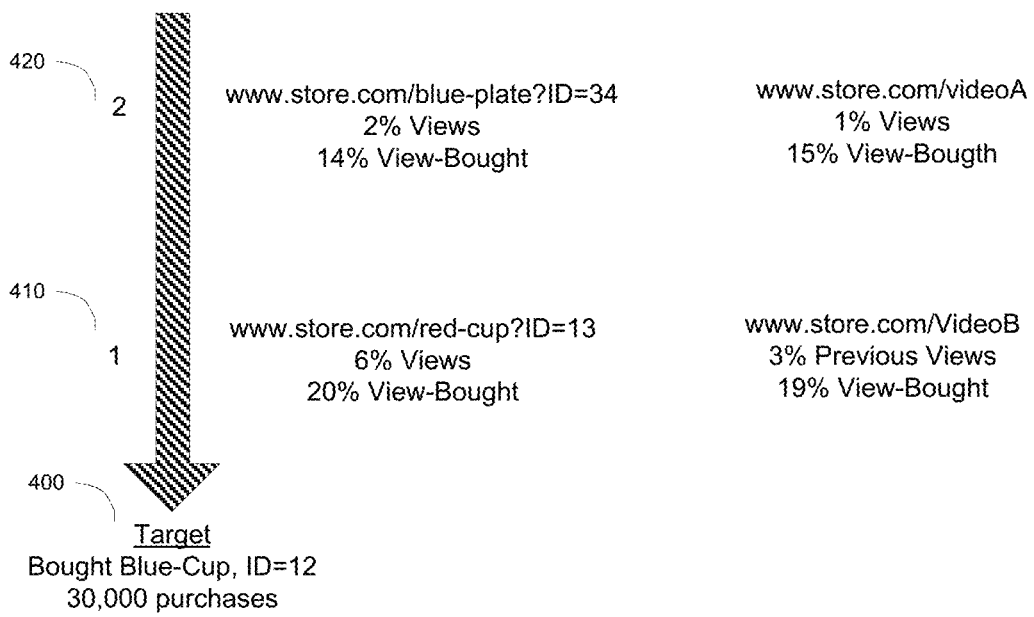
Figure 5:
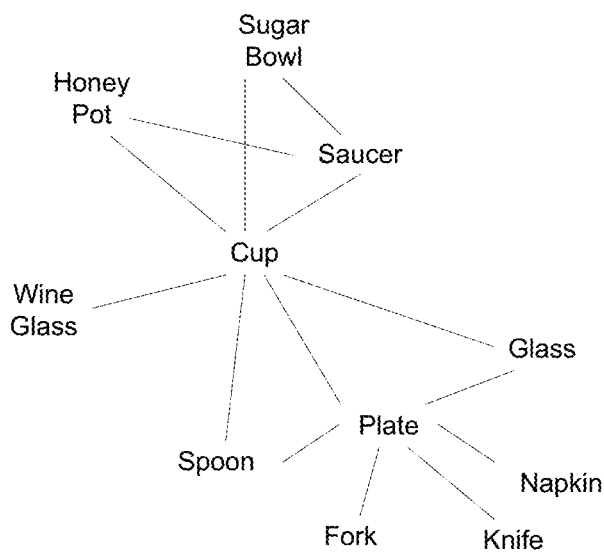
Figure 6:
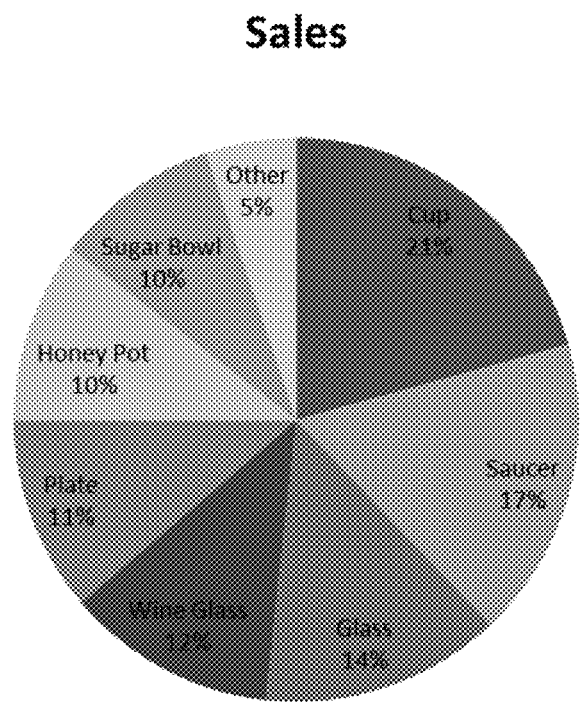
Figure 8:
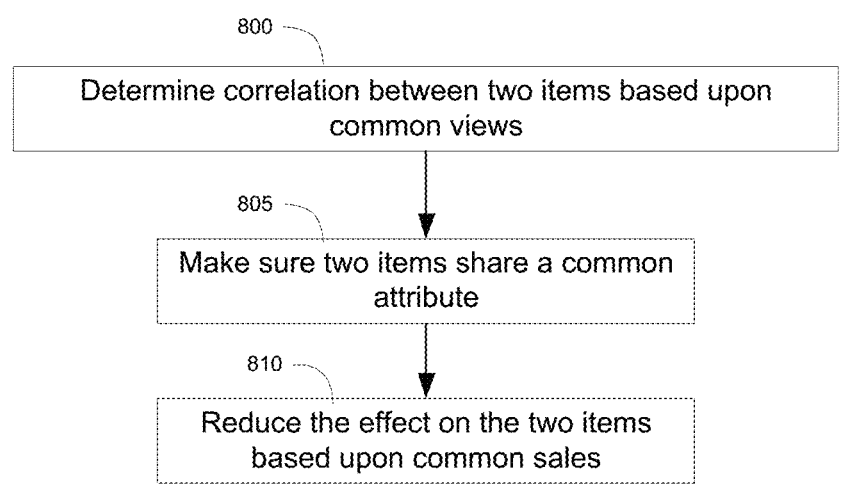
Figure 9:
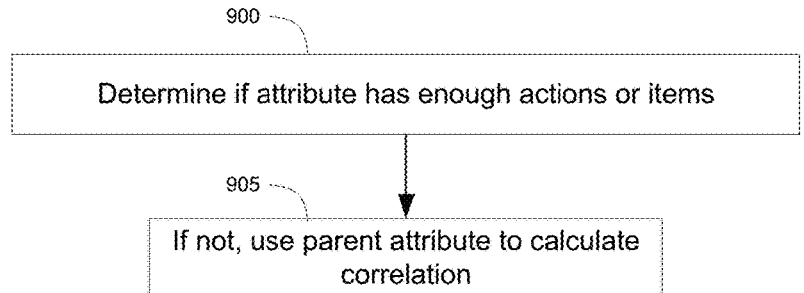
Figure 10A:
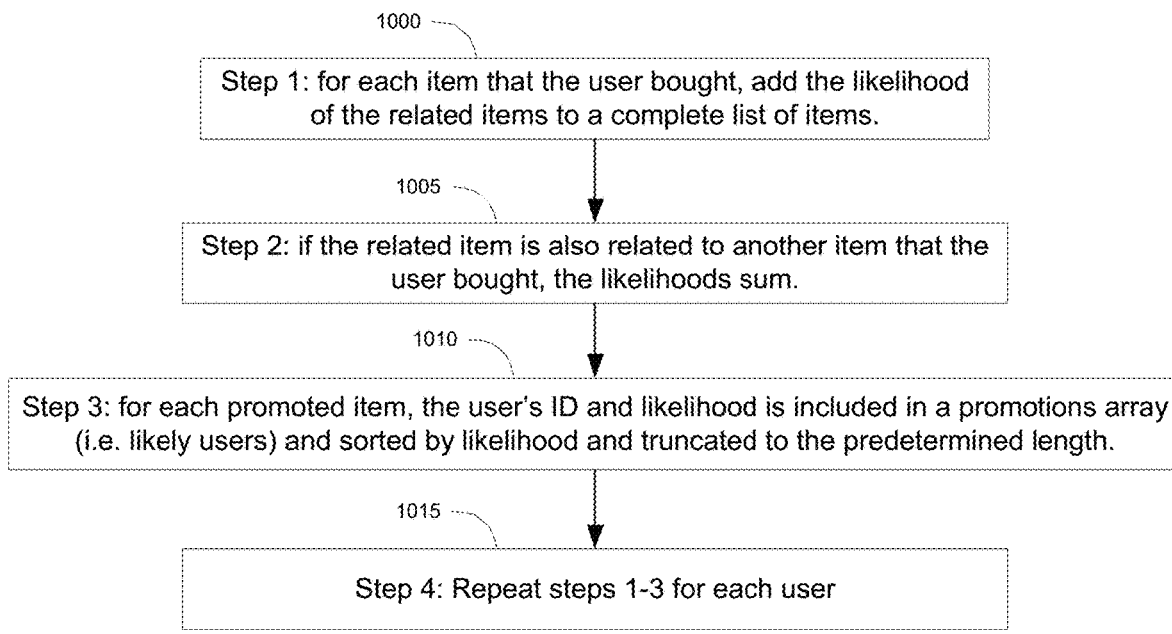
Figure 11:
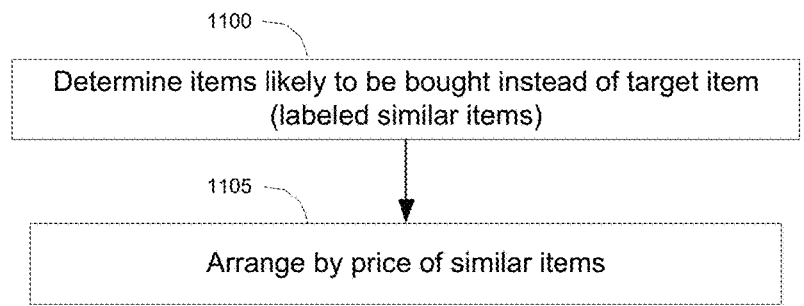
Figure 10B:
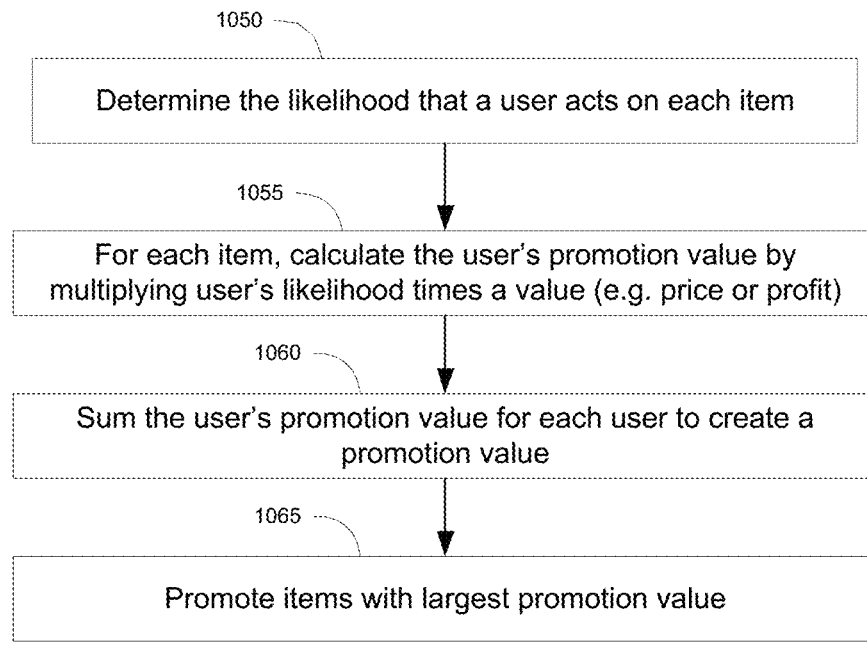
Figure 12:
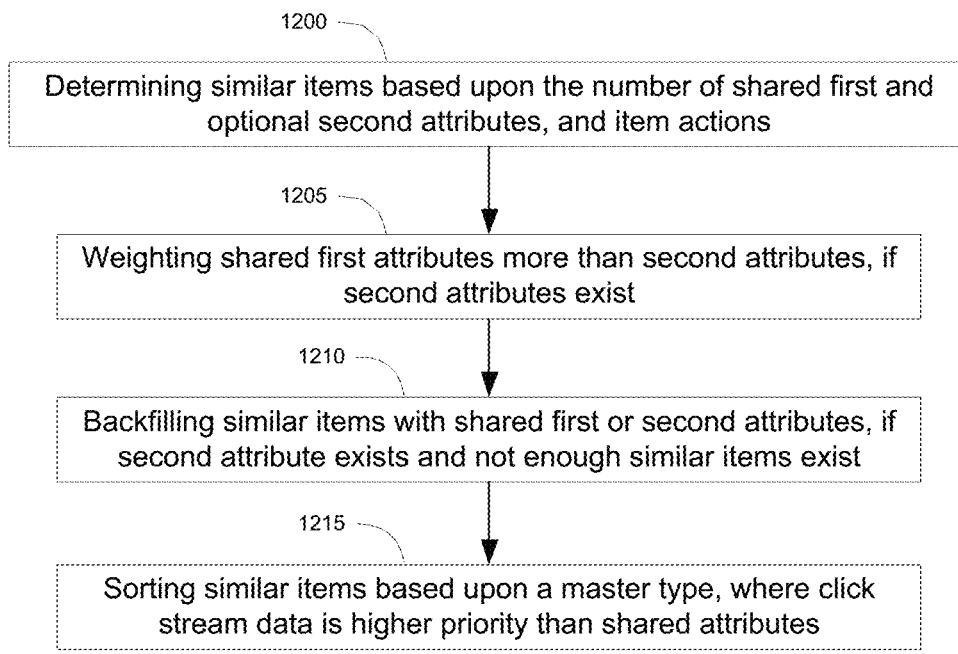
Figure 13A:
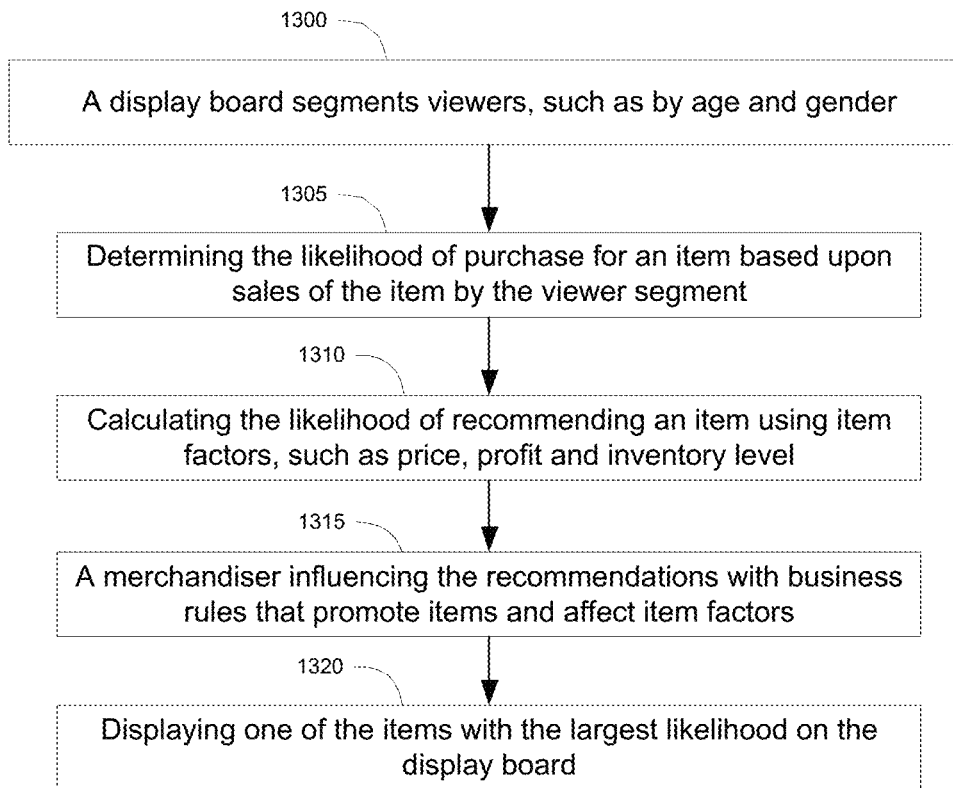
Figure 13B:
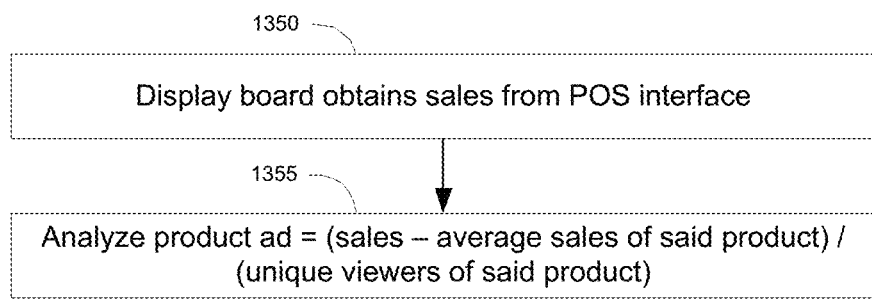
Figure 14:
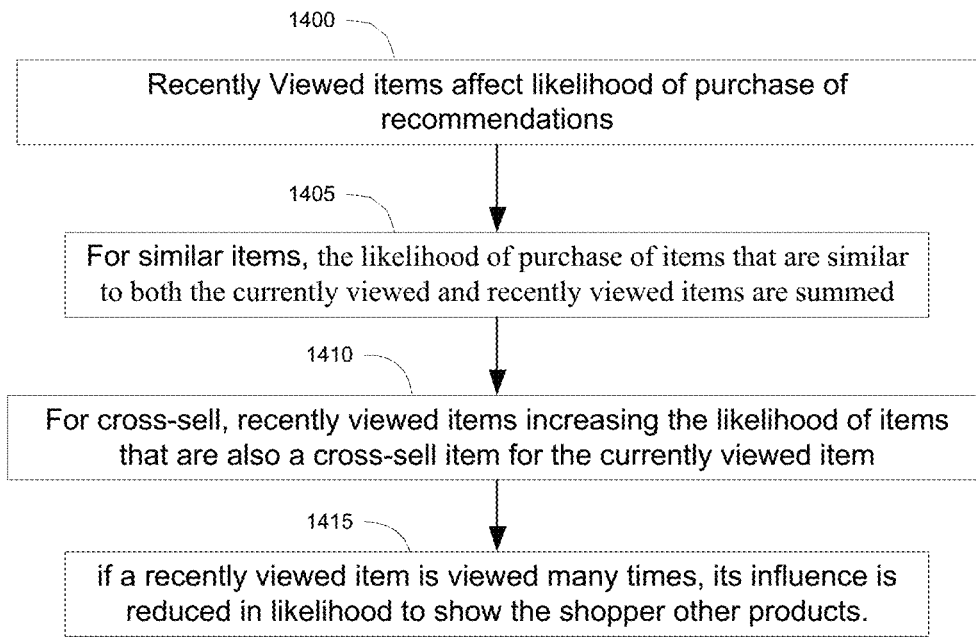
Figure 15A:
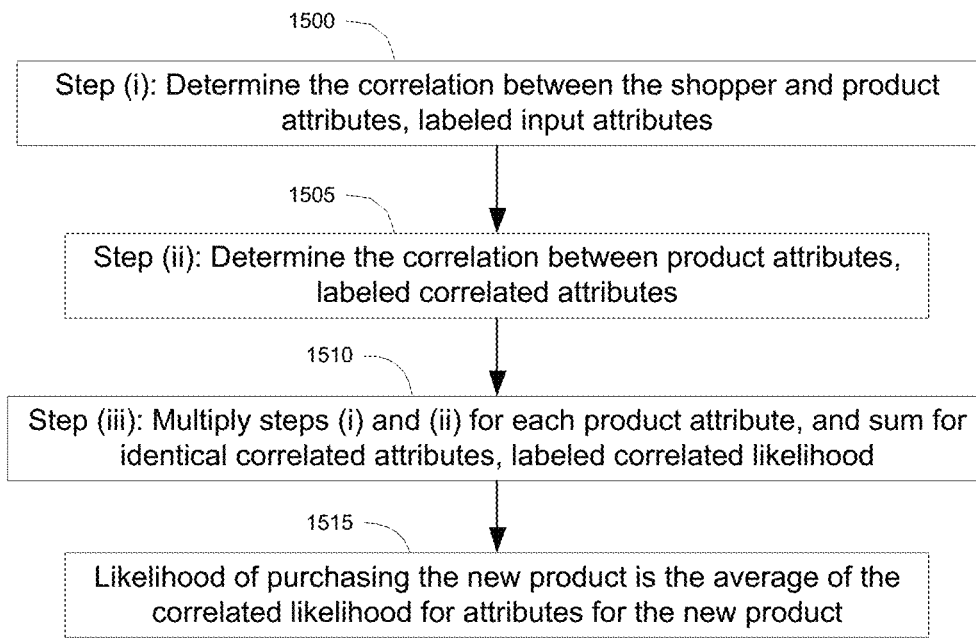
Figure 16:
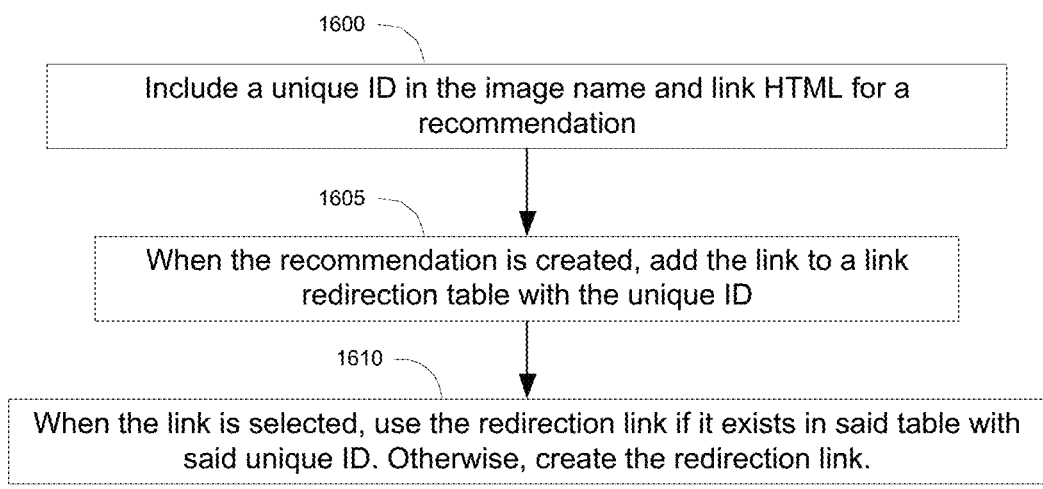

FIG. 1A shows the method to create recommendations based upon friends' actions using clustering.
FIG. 1B shows the method to create recommendations based upon friends' actions using real-time filtering.
FIG. 2 shows the method to create add-on promotions with cross-sell.
FIG. 3 shows the method to focus promotions of new products to likely users.
FIG. 4 shows an automated analytics pipeline with web page correlations.
FIG. 5 shows a graphical display of correlated items.
FIG. 6 shows a pie chart of sales.
FIGS. 7A, 7B and 7C show bar charts and text versions of the distribution of product and customer purchases.
FIG. 8 shows the method to improve similar items with behavioral data.
FIG. 9 shows the method for advanced genomic recommendations.
FIG. 10A shows the method to calculate users likely to buy a promoted item.
FIG. 10B shows the method to calculate the top products to promote.
FIG. 11 shows the method of determining similar items based upon matching numerous attributes.
FIG. 12 shows an improved method to determine genomic similar items.
FIG. 13A shows the method to choose products to show on a display board.
FIG. 13B shows the method to analyze the effectiveness of a display board ad.
FIG. 14 shows the method in which recently viewed items affect recommendations.
FIGS. 15A and B show two methods to determine the likelihood that a shopper will buy a new item.
FIG. 16 shows the method to more effectively create dynamic recommendations for emails.

DETAILED DESCRIPTION OF THE INVENTION

1. Terminology

Regarding terminology, items include products, news, articles, items, songs, movies, images, web pages, etc. The terms products and items are used interchangeably. Users include customers, consumers, recipients (such as for email), shoppers, or anyone browsing or interacting with the web page, website, or any item. These terms are also used interchangeably. Websites and web pages are not limited to their current implementation, but also refer to information that is available through a network to any device, including computers, televisions, mobile phones and other mobile devices (e.g. iPad). Actions include purchases, plays, rentals, ratings, views, reading an article, downloads, or any other usage or action, unless specifically limited. Social networks or social media are services like MySpace or Facebook, where users have a profile and interact with other users, either directly, or within groups. Mobile commerce is the purchasing of products on mobile devices, usually cell phones or smart devices, such as an iPhone or Android. Attributes are characteristics of items or users, such as category, brand, collection, weight, color, gender, and so on. Crowd based recommendations are based upon the activities of users directly on the items, e.g. 'Customers who bought this, also bought these'. Genomic based recommendations, previously called categorical recommendations in patent application Ser. No. 12/764,091, are based upon activities on the item's attributes and then applied to the target item. Recommendations and analytics can be used interchangeably since recommendations are automated, intelligent and predictive analytics. Social graphs are lists of friends and interests for each user in a social network. The friends can be ranked with a hierarchy or groups, or not. Similar items are recommendations for products that are similar to the currently viewed product. The convert browsers to buyers by showing them something they may by if they don't like the current product. Cross-sell items are recommendations for products that are bought with the currently viewed product. Personalized items are recommendations of products that the user would enjoy. Target item, primary item and currently viewed items are the same and used interchangeably.

2. Recommendations Among Friends

A social graph from a social network can be used to improve recommendations. When determining recommendations by using only actions among friends for each user, the solution can become computationally complex. This occurs because recommendations for a product will be different for each user. As such, if there are 10K products and 100K users, there will be 1 billion combinations (10K products*100K users) for which to calculate and save recommendations.

There are two ways to simplify this complexity: (1) clustering friends into common groups, and (2) real-time filtering based upon friends actions.

Clustering into Common Groups

In the first embodiment, as shown in FIG. 1A, the users are clustered into a few groups based upon friends (like 10 to 100 groups), and recommendations are calculated for each group. In the example above, this results in 100K to 1M combinations (10K products*10 or 100 user groups) to calculate and save recommendations.

The clustering can use any known technique, such as iterative distance-based clustering, EM algorithm, and Bayesian clustering (as described in "Data Mining: Practical Machine Learning Tools and Techniques" by Ian Witten and Eibe Frank, 2005, Elsevier, incorporated herein by reference), as well as gravity clustering. The input is each user's list of friends. The result of the cluster analysis is a fixed or variable number of common friend groups, but greatly reduced from the total number of users. In essence, hundreds of thousands of individual friend networks are reduced to tens to hundreds of common friend groups based around common friendships. The clustering system saves the users in each common friend group, which is used by the recommendation engine (as described below).

Then, for each of these common friend groups, the actions are limited to the members in this group, and the recommendations are generated using any technique with this limited action set. The generator system doesn't know that it's not receiving all of the possible actions, and nothing but the input is changed in the creation of the recommendations. The correlation techniques for non-rated data described in application Ser. Nos. 12/764,091 and 13/107,858 can be used.

If not enough recommendations are provided for a product or user, the system also calculates recommendations for the complete action set (independent of friends) and default to those results for remaining recommendations. Furthermore, if not enough recommendations are available from the complete action set, the system defaults to genomic recommendations. In addition, before defaulting to the complete action set, the system can use genomic recommendations based upon the limited actions in the common friend group since genomic recommendations will be different for each common friend group.

The recommendation engine then performs two steps. First, for the user, it selects the common user group. Then, for the common user group, it selects the recommendations. The recommendations can still be cross-sell, similar, personalized. In fact, the cross-sell can still be influenced by items in the cart or wish list, and by the user's previous purchases (as described in application Ser. Nos. 12/764,091 and 13/107,858), and cross-sell and similar influenced by recently viewed items as described later in this application.

The system preferably limits a user to be part of one group, but can weigh the user in multiple groups. In the latter case, the recommendations are weighted results of the recommendations from each common friend group that the user is a member. The latter case is more computationally complex.

Alternatively, the clustering of users can revolve around common interests. The social graph shows each user's likes and groups that they are a member. Using these likes and/or groups as the input to the clustering algorithm, the resulting common users are based upon common 'interests'. This can be combined with friends, or used instead of friends. The retailer can determine if they want to use friends and/or interests, and, even which interests to focus on (e.g. likes or groups).

Clustering can be used to group each user's friends into subgroups, such as family members, co-workers, college friends, current friends, etc. Within these smaller groups, items bought by the most number of people, i.e. popular items, can be recommended to the user.

Real-Time Filtering Based Upon Social Graphs

In the second embodiment, as shown in FIG. 1B, the generator runs on the complete action set. The social graph, i.e. list of friends, for each user, is known. Then, the recommendation engine filters the recommendations to keep only those items that a friend has acted upon (e.g. bought, viewed, rated, reviewed, or recommended). In other words, if a friend has not bought a recommendation, it is not recommended as cross-sell. If not enough recommendations are found after filtering, the remaining recommendations are filled from the complete set.

More specifically, when the recommendation engine is responding to a recommendation request for a user, the resulting recommendations are first determined. Then, for each friend in the user's social graph, the items acted upon by the friend are compared to each recommendation. Recommendations that are acted upon by friends are kept in the recommendation list. Those not acted are withheld. They are included if needed to fill in the remaining part (i.e. bottom) of the resulting list because enough recommendations were not acted upon by friends. The system can be efficient by only comparing recommendations that have not been acted upon by a friend for each subsequent friend.

The actions can be purchases, views, ratings, reviews, recommendations, or all of these. It can be different for different recommendation types. For example, for cross-sell or personalized, the actions can be purchases. For similar, the actions can be any type.

Preferably, the social graph is pre-emptively saved in the recommendation system so it can be used with utmost speed. It is updated periodically, such as daily. Alternatively, the system could request the social graph from the social network at the time of the recommendation request. However, this could result in a delayed response. In ecommerce, speed is critical, and web pages should appear in 1.5 seconds. The system could save the social graph for a period of time, like a day, and update during the call if out of date. However, again, there could be a delay.

Alternatively, the filter can use friends and friends of friends. This extension can be used if a person has too few friends, such as under 50 friends. The system can go to friends of friends of friends until enough 'friends' is found, such as 50.

Furthermore, the filter can use the members of a cluster based upon friends and/or interests as discussed above. Similarly, the filter can use people who belong to one or more groups.

3. Promotion Add-Ons

Products are often promoted to increase sales. As shown in FIG. 2, cross-sell products are added to the promotion to increases sales. For example, a shopper can received 10% off if buying product A, and receive the same discount if they also buy cross-sell product B (which is often bought with A). The system can even increase the discount if two or more cross-sell products are bought, such as 15% if both are bought.

In social networks, discounts are often related to convincing friends to buy a product. For example, if you convince four friends to buy product A, you all receive a 10% discount. If each friend buys another cross-sell product, you can receive a 15% discount. Similarly, if you convince ten friends to buy product A, you receive a 20% discount, and if each friend buys a personalized cross-sell product, you all receive a 25% discount.

The system works by requesting cross-sell recommendations for the promoted product, and displaying these related products to the user. The recommendations are preferably personalized to each user to increase the likelihood of an additional sale, such as using previous purchases and recently viewed items (discussed below in this application).

3a. Focused Promotions

The method to find which users to promote an existing product is discussed in section 8: Campaign Optimization. The methods to promote new products are discussed in Section 13: Personalized Recommendations for New Products and Flash Sales, and shown in FIG. 3.

4. Display

The display shows the related items for a target item, or group of target items and optional influencers, such as 'items in cart', 'recently viewed' and 'wish list' items. These influencers help re-order the related items to the target item(s), but don't cause new related items to show up (as discussed in the materials incorporated by reference).

In addition, whenever the user clicks on a related item, the related item becomes the target item, e.g. if there's only one target item, or is added to the target items if several are listed.

The items can be web pages, products, categories, brands, and any attributes.

FIG. 4 shows a pipeline display. It is fully described in the next section: 5: Automated Analytics.

In one preferred embodiment, the display is graphical, showing the target item in the center and related items around it, with the distance inversely proportional to the relatedness (which we call likelihood).

This continues with concentric circles, and light lines between related items, as shown in FIG. 5. When the user rolls their mouse over the item, the related items appears in a list. When the user clicks on an item, it becomes the target item and the graphical display shifts.

The display also shows pie charts, as shown in FIG. 6. Every pie chart shows N+1 other items, where N is usually 20 items and the +1 includes the "other" items. The display shows further stats, such as top selling products, top selling products for each category (or any attribute), related categories for each product. There is a pie chart for products with related products, but it shows the relative strengths of each related items because the related 'likelihood of purchase' does not have to add up to 100%.

Many retailers are very interested in under-performing products. We list the worst selling products and categories. Products and categories can also be listed by sales or views (or any action).

We also show the best and worst shoppers in terms of purchases or views.

Finally, we show sales statistics in terms of number of products bought by customers; e.g., how many customers bought 1 product, and how many bought 5 products. The detailed view divides the range between the minimum and maximum number of products bought by customers into bins, typically 100, and shows the number of customers that bought a number of products in the range of that bin. Any outliers are removed. For example, if customers bought 1 to 200 products, the bins are 1-2, 3-4, etc. (products bought) and the number of customers that bought 1 or 2 products are shown in the first bin (y axis), and so on. The graph is optimally displayed as bar charts. A simple version with 10 bins is shown in FIG. 7A. The simple text view is shown in FIG. 7C, where it is divided into two groups, customers who bought more than 10 products, and customers who bought less than 10 products.

A similar graph shows how many customers bought a range of products; e.g. how many products were bought by 1 customer, and how many products were bought by 5 customers. The detailed view divides the range between the minimum and maximum number of customers that bought a product into 100 bins, and shows the number of products bought by customers in the range of that bin. Any outliers are removed. For example, if products were bought by between 1 to 5,000 customers, the bins are 1-50, 51-100, etc. (bought by customers) and the number of products bought by 1-to-50 customers are shown in the first bin, and so on. The graph is optimally displayed as bar charts. A simple version with 10 bins is shown in FIG. 7B. The simple text view is shown in FIG. 7C, where it is divided into two groups, products bought by more than 10 customers, and products bought by less than 10 customers.

An additional display shows the customers that are likely to purchase a product. As discussed in this application and/or the materials incorporated by reference, the likely products that a customer will buy can be determined. This list can be searched such that the customers that are likely to buy a product is determined, and displayed (such as in a drop list). The user (think retailer) can determine the number of customers to display.

5. Automated Analytics

Automated analytics determine which web pages are viewed together or which web pages are viewed in relationship with buying an item. The input data is web page URL and product ID, and the users who viewed the pages and products, or bought the products. The algorithm uses any correlation technique to relate the data in terms of two key aspects: (i) view-view="people who viewed this, also viewed", (ii) view-bought "people who viewed this, also bought", and (iii) bought-bought "people who bought this, also bought".

Regarding view-view, it is very interesting to see which web pages are viewed in relationship to each other. Regarding view-bought, it is very interesting to see which web pages are viewed in relationship to a purchased product. This data is asynchronous, meaning that it can be across different browsing sessions, and the items don't have to be viewed sequentially. Similarly, the page view and product purchase don't have to be sequential. The data can be limited to a session (defined as not paused for 30 minutes), or across all session, and can be limited to a specific number of days.

The view data can be combined with the traditional funnel or navigation to expand the understanding of user's behavior. As shown in FIG. 4, the navigation path (a.k.a. funnel) shows which pages were viewed in sequence before buying a blue cup. The relationship between each page in the path and its view-purchase correlation with the purchase is shown. For example, the purchase is shown in 400. The top two pages viewed just before the purchase are shown in 410, and pages viewed two clicks before the purchase are shown in 420. Any number of pages can be shown for the clicks before target, and any number of clicks before target can be shown.

The importance of FIG. 4 is that it shows the important pages that lead to the purchase. If a retailer is A/B testing, it shows which pages worked better. The solution does not require the retailer to mark pages to specifically test them, and the results are not limited to one visit session. In this example, the results show that video B worked better than video A in selling the blue cup.

The relationship between each page in the path and other viewed pages are shown when the user clicks on the page listed in FIG. 4. When an item is double clicked, it becomes the target item and the new pipeline is shown.

The target can be other web pages, and the funnel is viewed pages with view-view correlations shown in the pipeline. Alternatively, the target can be purchased products, and the funnel is sequentially purchased products with bought-bought correlations.

In another preferred embodiment, web pages are categorized with more types, including view, read, and exit. Viewed pages are browsed for a minute or less (or any time period). Read pages are browsed for a minute or more (or any time period). Exit pages are the last page viewed on a site (noting that exit is not mutually exclusive with view or read). Now, the above analysis can be performed on each type. For example, the funnel target can be a read page, and the funnel shows the most read pages in the previous few clicks, along with the correlation between these pages and target. The funnel could show both view and read pages. In a similar example, the funnel target is an exit page, and the viewed and read pages are shown in the funnel along with related viewed or read pages. There are more combinations, but these examples show the importance of the types of view, read and exit.

Additionally, the pages can also be labeled as info and product, where an info page provides general information and a product page provides details about a product that should lead to a purchase (aka product detail page). This type of labeling leads to automated web reports that answer key questions about what information leads to a purchase (and what does not)—in other words, reports that don't have to be customized by a consultant, thus, reducing costs.

6. View Data

In the patent applications incorporated by reference there are solutions for correlating view data. The method to improve view data is shown in FIG. 8.

In the preferred embodiment, the final results are filtered by one or more attributes, such that the related viewed items share a same attribute(s) as the target item. This provides a better similar item, where a similar item is an alternative for the displayed item.

For example, when one attribute is used and it is category, the related viewed items are from the same category. Thus, when looking at a sock, the system will show other similar socks even though shoppers may have looked at shoes. (As a side note, the sales data provides the cross-sell to show the shoes that are bought with the socks.) Since items can have several attributes, the solution makes sure that at least one attribute is shared between the target item and similar item. Optionally, it weighs the correlation of products that share numerous attributes more heavily. For example, the weight is 1 for sharing 1 attribute, and then adds 0.1 for each additional shared attribute.

In addition, items that are bought with the viewed item are removed from the view data. The preferred method is to subtract the correlation (also known as similarity or likelihood in the patent applications incorporated by reference) based upon purchase data for view data. The correlation takes into account that there are fewer purchases than views. Brute force can be used, and each purchase by a user is removed from the view data. However, shoppers often view an item several times before purchasing, so this method can be flawed. An alternative is to remove any two items from view data that are included in cross-sell data (where cross-sell data may have a minimum correlation and minimum common buyers). In our preferred embodiment, the cross-sell has 20 to 100 related items for each target item. Any other method that takes the ratio of views to purchases is applicable.

7. Genomic Advances

The patent applications incorporated by reference describe a method of creating recommendations based upon correlation of item attributes. This is labeled genomic or categorical recommendations. This method is used for items that have few actions (e.g. sales). The attributes, such as category, have a structured relationship with parents and children—e.g. shoes>running shoes>trail running shoes, or shoes>dress shoes>traditional dress shoes. In some cases, there are so few items with an attribute that the attribute has no or few actions. In these cases, the attribute's parent is used to determine the categorical recommendations. Specifically, if an attribute has few than two sales, two or fewer items, or no related attributes, the parent attribute is substituted for the child attribute in the recommendation calculations. These calculations include finding correlation between attribute pairs, as shown in FIG. 9.

8. Campaign Optimization & Promotion

Determining which items to promote and to whom to promote them can be difficult. Users likely to act upon an item, known as likely users, can be created with many methods, such as neural networks or collaborative filtering, such as described in patent application Ser. No. 12/764,091 on pages 7-8 and in section 'Likely Items and Likely Users' on page 27-28, incorporated here by reference. Per this technique, likely users can be determined using similar users, or users who acted upon related items.

Recommendations systems, such as those discussed in the referenced applications, determine products likely to be bought by users, known as personalized (or likely items). When a product is promoted, these personalized items can be searched for the promoted product, and every user that is likely to buy them received a promotion via mail, email, on a website, or via any promotional method.

In other words, likely users can be created from personalized recommendations. The steps are searching the personalized recommendations for each item, and listing the user that is likely to act upon the item in order of likelihood. This method is very similar to the calculation of personalized items from related items, except, in this method, the truncation of the list (i.e. not all items are include for likely items) removes items that are not likely to be bought by any user. This is okay since these items are not optimal for promotion. This method is beneficial if personalized are already calculated by the recommendation engine since it is more efficient to use this truncated list than recreate from all related items. The likely items (a.k.a. personalized) list includes 20 to 100 items for each user.

For the best accuracy or if the retailer wants a long list of users (more than a quarter of all users) to promote items, the raw data is used. In this case, the retailer typically promotes a few items, like 10, and requires a list of thousands to millions of users, such as $\frac{1}{3}^{rd}$ of all users. As shown in FIG. 10A, the method is as follows. Step 0: the method starts with a complete list of items with likelihood set to 0, and the list is reset for each user. Step 1: for a user, for each item that the user bought, add the likelihood of the related items to the complete list of items. Step 2: if the related item is also related to another item that the user bought, the likelihoods sum. At this point, there's an array of how likely a user is to buy every item. Step 3: for each promoted item, the user's ID and likelihood is included in a promotions array (i.e. likely users) and sorted by likelihood. If the likelihood is less than the last item in the list, the user is not included. Step 4: repeat steps 0 through 3 for each user.

The array's length was pre-determined by the retailer as the number of users to promote the item. The result is an array of number of promoted items by the number of users to which to promote. Typically, the resulting array contains email addresses for the users, so the item can be promoted to them via email. The resulting array can contain user IDs that can be converted to email, phone or mail addresses for promotions.

Alternatively, the retailer can promote to users that are more likely than a minimum value to buy the item. In this case, the length is variable for each promoted item.

As shown in FIG. 10B, the top items to be promoted are determined. The method uses the first part of the calculation of likely users (i.e. users that are likely to act upon an item). For the best accuracy, the steps 1 and 2 from the raw data method are used (previous paragraph). For most efficient operations, the personalized items are used. In either case, the likelihood that a user acts on a list of items is determined. For each item, the likelihood that the user acts on the item is multiplied by a value for an item, like price or profit, to determine the user's promotion value. For each item, the user's promotion value is added to the total promotion value, which starts at 0. This is repeated for all users. The results are an array of all products with a value. The items with the largest promotion value are best to promote.

The promoted items can be provided by the retailer to create the likely users, or the retailer can calculate the top items to be promoted and then create the likely users for the top items, typically 5 items.

9. Upsell

Upsell recommendations are similar items (items that are acted upon instead of the target item) with lower in priced recommendations moved to later in the recommendation list. As shown in FIG. 11, the similar items are arranged by price. In the preferred embodiment, the ratio of the price of the recommendation to the price of the target item is used to re-arrange the recommendations order. Specifically, if the recommendations price is less than the target item's price, the square of this ratio is used to scale the likelihood before sorting the list of similar items. An upsell factor is used, such that any item below the price of the target item times the factor (i.e. creating an upsell threshold) is moved to the end of the list or disregarded if enough items above the upsell threshold exist. An upsell factor of 1 creates recommendations that are all more expensive than the target item. The preferred upsell factor is 0.2. This enables intelligent scaling for upsell.

Alternatively, the price can be replaced by profit. There could be an additional factor for inventory that affects the arrangement, such that profit is reduced as inventory falls below a threshold, like 5. A linear reduction to 0 as inventory goes from 4 to 0 is a simple method.

Furthermore, the recommendation order can be affected for recommendations that are more expensive than the target item. In this case, the ratio of the price, rather than squared ration, is more ideal since it rises more slowly. In other words, the effect for a lower price is greater than the effect for a higher price recommendation.

10. Similar Items Sharing Multiple Attributes

Similar items can be found by looking at number of actions and a shared attribute (e.g. category). However, many companies place items in numerous attributes, or have a catch all attribute for most products. For example, in apparel, the categories may be men's shorts, men's khakis, men's jeans, and the catch all, men's pants. In this case, a top selling item will show up everywhere because it is in men's pants along with all other pants. This top seller is not always a good recommendation.

As shown in FIG. 12, an improvement is to find similar items by looking at the number of shared attribute and number of actions (e.g. sales). In this case, an item with 1 sale and 3 shared attribute elements is more similar than an item with 20 sales and 2 shared attribute elements. The implementation can use the number of shared attributes as the primary ranking and number of sales as the secondary key. The preferred implementation multiplies the number of shared attributes by the maximum number of items for any items, and then adds the number of actions for the similar item. This orders products by number of shared attributes without sorting by two aspects.

Furthermore, when a second attribute is used, such as brand or manufacturer, it is lowered in importance by not multiplying by the maximum number of sales. In the preferred embodiment, similar items are required to share at least one first attribute (e.g. category) and one second attribute (e.g. brand), and items belong in only one second attribute. (Limiting to one second attribute is not critical to this algorithm, and second attributes can be sorted by number of shared second attributes, but weighted less than first attribute elements.) If not enough similar items exist, they must share at least one first or second attribute. As such, an item with only one shared first attribute will be ordered higher than an item with only one shared second attribute, because the item with the first shared attribute has a likelihood (i.e. weight) of maximum actions plus current actions whereas the second attribute only is weighted current actions. In another example, the following is the sorting for similar items for four items where the system is matching first and second attributes: (1) an item with 1 shared first attribute and 1 shared second attribute, (2) an item with 2 shared first attributes, (3) an item with 1 share first attribute, and (4) an item with 1 shared second attribute.

Even if second attributes exists, the retailer can set a rule such that second attributes are not required for similar items. This rule can be different for recommendations that only share attributes (known as genomic similar), and clickstream based recommendations (known as crowd-based similar). For example, genomic may require both attributes match, whereas crowd-based may only want only attribute 1 to match for flexibility since this method uses shopper's behavior. Alternatively, both could require both attributes to match or no attributes to match. In crowd-based similar, only one attribute needs to match as the weighting comes from the user's behavior, or it can weight multiple attribute 1 matches as discussed in section 6 above.

Finally, similar items are preferably related by click stream data, with users viewing an item and then ultimately buying an item or common users viewing items. These similar items based on click stream are preferably limited to having at least one shared attribute. However, if not enough of these similar items exist, the similar items that share the most attributes (as just described) backfill the similar items. In the preferred embodiment, the similar items have a master type, with the order of types being (1) viewed, then bought, (2) viewed together, (3) share at least one first and second attribute, (4) share only one or more first attributes, (5) share one second attribute, (6) top sellers. Similar items are sorted within type, such that not item of a higher type is recommended before a lower type.

11. Recommendations & Analytics for Display Boards that Segment Viewers

Currently, there are digital display boards with cameras that can identify a viewer's gender and age range, and display items based upon this viewer's segmentation. These displayed items are chosen by a person, such as store manager or merchandiser. They are static until the merchandiser changes them. Segments are gender of male and female, and age ranges of 0-3, 4-12, 13-25, 26-35, 36-50, 50-70, 70+.

As shown in FIG. 13A, recommended items can be intelligently and dynamically chosen based upon the actions of viewer's gender and age segment, along with item price or profit, inventory, number of purchases by time period (e.g. last 7 days) or time of day during time period. In other words, by the viewer's and item's segment. Example time-of-day segments are 8 PM to 7 AM, 7 AM to 10 AM, 10 AM to 2 PM, 2 PM to 8 PM.

More specifically, for each viewer segment, the system tracks what is bought for the previous time period and time-of-day segment (if applicable). When a viewer is identified, the most often purchased items for that segment are shown. The solution tracks the sales from a point of sale in the store, ecommerce sales, and/or sales from the display board (if applicable). If the display board enables sales, items are sorted by likelihood of purchase, which is percentage of time an item is bought when shown.

Furthermore, in the preferred embodiment, the items are also sorted by the price or profit and inventory. The preferred formula to calculate the likelihood for an item to be recommended is: likelihood=number of item sales/maximum sales+current item inventory/maximum inventory+current item profit/maximum profit. The maximums are determined from all items such that maximum sales is the number of sales for the top selling item during the time period and time-of-day segment, if applicable; maximum inventory is the items with the most inventory; and maximum profit is the item with the largest profit. Alternatively, there are many similar formulas, such as ones that create maximums from a user selected value.

If the display board tracks sales, then the formula is: likelihood=% bought when shown/maximum % bought when shown+current item inventory/maximum inventory+ current item profit/maximum profit. Only the first element changes, and, for this element, the maximum is the item with the highest percentage of purchase when shown during the time period and time-of-day segment, if applicable. The element, number of item sales/maximum sales, can also be included if other sales data is available, but it's preferable to not include this element if the display board has a reasonable amount of sales, such as items with more than 10 sales time period and time-of-day segment.

The store or chain merchandiser can overlay business rules on the solution. Rules include the ability to promote an item, items in a category or by a manufacturer (e.g. brand), as well as utilize inventory levels, price, and profit. The rules are implemented by weighting the appropriate term in the likelihood formula. For an item or item in the category, the first likelihood element is weighted, such as by 1.2×, 2×, and 3× for low, medium and high promotion factor, respectively, when the item matches the rule. For inventory, a similar factor is used on the second element, and for profit a similar factor is used for the third element in the likelihood equation. In the preferred embodiment, a factor is also added. This helps promote new products that don't have many sales. In this embodiment, a 5%, 10% and 20% likelihood factor is added for an item that matches the rule. Similarly, if inventory is above a user specified level, the factor is added, or if profit is above a user specified level, the factor is added.

When the solution first starts up, if the display board enables sales, the solution starts looking at aggregate sales, which are replaced with % bought when shown after the minimum sales time period is met for any recommended product (e.g. 10 sales in time period and segment).

The item with the largest likelihood is shown, or, preferably, the solution randomly chooses between the five items with largest likelihood. When an item is displayed, cross-sell and similar items can also be shown, where these recommendations are determined from any method, such as those discussed in this application and applications incorporated by reference.

Alternatively, rather than automatically displaying the recommended products for the viewer, the recommendations are shown in a drop down list when the merchandiser sets up the display board. In other words, the recommendations help the merchandiser determine which items they should display, but still leaves the control to the merchandiser.

Real time analytics are also important for the display board. As shown in FIG. 13B, when advertising a product on the display board the sales for that product are tracked. The correlation between display board views and sales for the product is created and shown to the retailer in a dashboard. The sales are determined by interfacing with the point of sale (POS) system, and sending each sale to the display board. When the display board enables sales, the POS is on the display board. In this case, the system may get sales from both the display board POS and POS for the store.

The correlation is calculated in the display board as (number of sales minus average number of sales for the product)/(number of unique viewers of the product) during the identical time period. The time period can be every hour; two hours; or morning, lunch, afternoon and evening. The time period for sales can extend 30 minutes longer than display to account for the shopper to finish shopping and pay. The time period may be forced to have a longer delay for POS that do not instantaneous upload sales to the interface. The average sales for each product is optimally determined and saved from a previous day at the same time period, or from a different time period. If the board does not determine the number of unique viewers, the number of views is the number of displays divided by the total number of shoppers, or individuals who purchased during that time period, or any method to normalize for the traffic in the store.

12. Recently Viewed Items

As shown in FIG. 14, recently viewed items are critical to personalizing recommendations to the current behavior of the shopper. Recently viewed items can be saved on the server for each shopper, but it's preferable to save them in a cookie on the shopper's computer and send them to the server when requesting recommendations. The recently viewed items affect both similar recommendations and cross-sell recommendations. The previous 3 to 20 viewed items can be saved, where we prefer 5 recently viewed items.

For similar recommendations, recently viewed items affect similar items by adding the likelihood of purchase of an item that is similar to the currently viewed (a.k.a. target) item and recently viewed. Similar items are correlated via click stream or attributes as described in this application and/or the materials incorporated by reference. In other words, if an item is similar to the target item and a recently viewed item, it is more likely the shopper will be interested in this item.

For cross-sell recommendations, recently viewed items affect cross-sell items by increasing the likelihood of the recently viewed item if it is also a cross-sell item for the target item. Cross-sell items are correlated via purchases and attributes as described in the previous art. For example, if a recently viewed item is also a cross-sell item, its likelihood of purchase is increased by 2 times plus 10%.

For personalized recommendations, recently viewed items affect personalized items by increasing the likelihood of the recently viewed item if it is also a personalized item for the target item. Personalized items are correlated via purchases and attributes, as described in the previous art. For example, if a recently viewed item is also a personalized item, its likelihood of purchase is increased by 2 times plus 10%.

Furthermore, if someone views a product more than a specific number of times, then, it is reduced in likelihood if it is also a recommendation, e.g. cross-sell item, and the similar items for the recently viewed items are have their likelihood of purchase reduced in the summation. This shows the shopper other items since they don't seem to have found the right item. The number of times an item is viewed can be saved on the server, but preferably on the shopper's computer in a cookie and sent to the server. The later method saves server space and, thus, reduces cost.

In the preferred embodiment, the likelihood is reduced by 20% on the $6^{th}$ view, and 20% each additional view (based on the original likelihood), such that the original likelihood is reduced by 40% on the $7^{th}$ view, 60% on $8^{th}$ view, 80% on $9^{th}$ view and excluded on $10^{th}$ view. For cross-sell, this means that the factor is reduced to 1.6+8% on the $6^{th}$ view, 1.2+6% on $7^{th}$ view, 0.8+4% on $8^{th}$ view, and so on until it is not included on the $10^{th}$ view. For similar items, the likelihood of purchase of the similar items for the recently viewed items are reduced by the formula above before being added to the similar items for the currently viewed item.

13. Personalized Recommendations for New Items and Flash Sales

New products occur on existing websites as well as websites that have regular products and flash sales. In both cases, retailers can increase sales with personalized recommendations (knowing who will buy the product). For flash sales, such as Gilt group or Groupon, it is very important to promote the correct product to the shopper, especially as the shopper joins more flash sales groups. For flash sales, the products are always new, and there is no behavior for that item. In addition, the sales happen very quickly, sometimes in seconds, so the system does not have time to learn new behavior.

To solve these issues, personalized recommendations for new products are related to product attributes. In the preferred embodiment, the shopper's previous purchase (or view) behavior is correlated to product attributes. The correlation is the number of actions in the product attribute divided by the number of total actions by said shopper. More complex correlations can easily be used. Then, as described in application Ser. Nos. 12/764,091 and 13/107,858 previously incorporated by reference, the product attributes are correlated resulting in correlated attributes (a.k.a. related attributes). Next, by multiplying the shopper's correlation for an attribute times the correlation of that attribute with correlated attributes, the likelihood of purchase for that shopper for each correlated attribute is determined. This multiplication is repeated for each attribute, and the resulting likelihoods for the same correlated attributes are summed. If the new product has several attributes, the likelihood is the average likelihood.

To clarify this method, let's assume that the retailer uses sales and categories as the attribute. An important aspect of this method is that the shopper may or may not be likely to buy an item in the same category as they've bought before. It will depend upon how everyone buys in the category, which affects the correlation of each category. In other words, since shoppers, in aggregate, may act on several products with the same attribute, the attributes may be correlated to themselves and/or other attributes.

To further clarify, let's look at a very simple example with two categories: coats and pants. We find that a shopper has 75% sales in coats, and 25% in pants. Coats are 5% correlated to coats, and 40% correlated to pants. Pants are 30% correlated to pants and 40% correlated to coats. Thus, this shopper likelihood of purchase is calculated as:

For coats=0.75 coats*0.05 coats-to-coats+0.25 pants*0.4 pants-to-coats=13.75%

For pants=0.75 coats*0.4 coats-to-pants+0.25 pants*0.3 pants-to-pants=37.5%

Therefore, for a new coat, the shopper is 13.75% likely to buy the coat. For new pants, this shopper is 37.5% likely to buy them.

The method is shown in FIG. 15A, and can be summarized as: (i) determine the correlation between the shopper and each product attribute, labeled input attributes (ii) determine the correlation for each product attributes with all other product attributes, labeled correlated attributes, (iii) multiply the correlations in the previous two steps for each product attribute (iv) sum the likelihood for identical correlated attributes, labeled correlated likelihoods and (v) the likelihood that the shopper will buy the new product is the correlated likelihood for the attributes of the new product. If the new product has more than one attribute, the average of likelihoods for all correlated attributes that are attributes of the new product is used. Note that the input attributes, correlated attributes and new product attributes are all the same attributes, but labeled to help describe the process.

For new shoppers, the correlation for actions on a product attribute is also performed for shopper attributes. The shopper attributes can be as simple as gender and age, but can also be more complicated, such as using social profiles. Thus, if the shopper is new (e.g. never bought anything), the shopper's attributes are used to correlate the shopper to product attributes. The correlation between product attributes is the same as above (based upon shopper's behavior, not shopper attributes).

To clarify, let's look at the very simple example from above with two categories: coats and pants. If middle-aged men are found to have a 25% likelihood to buy coats and 75% likelihood to buy pants, and the new shopper is a middle-aged man, his correlation to coats is 25% and to pants in 75%. As before, coats are 5% correlated to coats, and 40% correlated to pants. Pants are 30% correlated to pants and 40% correlated to coats. Thus, the middle-aged man's likelihood of purchase is calculated as:

For coats=0.25 coats*0.05 coats-to-coats+0.75 pants*0.4 pants-to-coats=31.25%

For pants=0.25 coats*0.4 coats-to-pants+0.75 pants*0.3 pants-to-pants=32.5%

Therefore, for a new coat, this middle-aged man is 31.25% likely to buy the coat. For new pants, this middle-aged man is 32.5% likely to buy them.

Figure 15B:
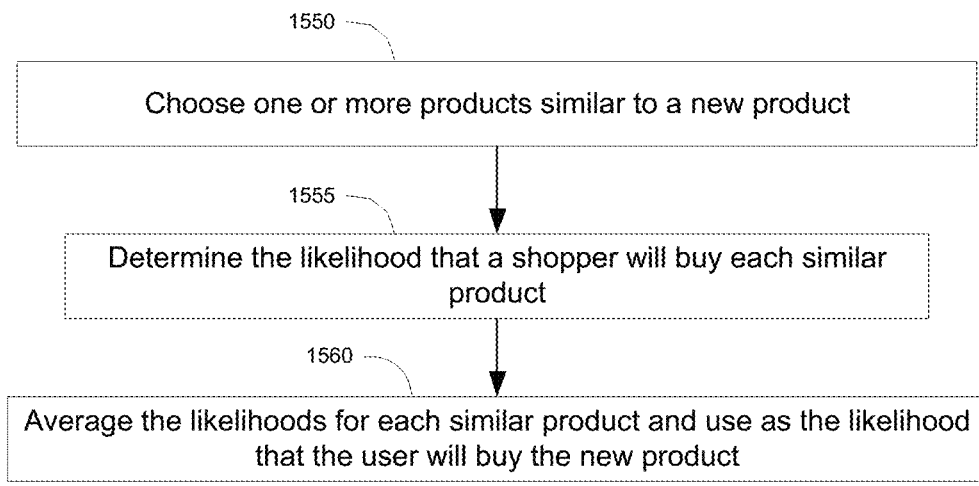

Alternatively, as shown in FIG. 3 and FIG. 15B, the retailer may choose one or more previous product(s) that are similar to the current product, and the shoppers that are likely to act on the similar products are likely to act on the new product. For example, if there's a new pair of casual pants and Joe is 10% likely to buy a previous pair of similar casual pants, he is 10% likely to buy the new pair of casual pants.

If more than one similar product is chosen, the average value of the likelihoods that the shopper will act each similar product is used. In other words, users that will act on only one of the similar items are included, but the likelihood is reduced. It could be a weighted average where the retailer determines the weight of each similar item. For example, if the product is 60% similar to pants A and 40% to pants B, and Joe is 20% likely to buy pants A and 10% likely to buy pants B, he is 16% (=0.6*0.2 for pants A+0.4*0.1 for pants B) likely to buy the new pants. The total weight preferably adds up to one, but that is not required.

The method to determine the likelihood of a shopper to act on the similar product is described in the in this application and/or the materials incorporated by reference. It is important to note that this analysis does not mean that the shopper bought the similar pants. It means that the shopper has bought items that other's bought with the similar pants. If the retailer allows resell, the shopper may have bought the similar pants. If the retailer does not allow resell and the shopper bought one of the similar pants, the likelihood for that specific pair of similar pants is 0, thus reducing the likelihood shopper to buy the new pants. Purchases were used for ease of explanation, but any action can be used in this description.

In addition, both methods can be used and the likelihood of purchase for any item is the weighted average of likelihood of purchase. In some cases, if the retailer is rushed. If the retailer doesn't enter attributes for the new product, the similar method is used with no weighted average. If the retailer does not choose similar products, only the product attribute method is used (no weighted average).

Furthermore, the system calculates this likelihood for each shopper and can create a list of every shopper whose likelihood is above a pre-determined threshold. This list is used to email or promote the product to the shoppers. When the shopper lands on the website, the likelihood can be used to determine which new products to show (assuming the site has several new products). In addition, other recommendations, like cross-sell, can be shown if the website also includes product with historical actions (i.e. it's not solely a flash sales site).

14. Improved Dynamic Email Tool

Dynamic email is described in section 13 of application Ser. No. 13/107,858, previously incorporated by reference. For this email tool, the situation arises where someone opens an email, requests images, and then clicks on the recommendation at a later time. During that time, the inventory could change, or the user's behavior has changed, and either change can cause the recommendation to change. Since the recommendation image is saved in the email, the link must redirect to the previously downloaded image. In addition, if a user has not downloaded the image, but clicks on the link, they need to be taken to a recommended product page. In other words, the link redirect must be created by itself and not created during the creation of the recommendation image.

The solution is to have the same unique ID in both the image and the link HTML, as well as the information (e.g. client alias, product ID, rec type, etc.) to create the image or link. When the image is created, the solution saves the redirection link to a table indexed by the unique ID. When the link is selected, the solution first looks for the unique ID in the redirection table. If found, the solution uses the table's redirection link. If the unique ID is not found, the solution creates the redirection link dynamically from the recommendation engine.

Furthermore, the unique ID can also link to a template on our server. The template includes the HTML, CSS and the client alias to create the display image for the email. It includes where the thumbnail image, price and name are shown, which font to use, and colors. Using a template and not including the client alias in the email HTML is preferred. It enables the retailer to have a different template for every email.

An example layout template (CSS not included since its standard) is shown below. The template shows what to include in the dynamic image, and the CSS determines where to locate the items in the dynamic image, the font to use, the color, and other aspects.

```
<div class="product4T">
    <img class="productImageImg" src="{IMAGELINK}">
    <div class="productnamecolor productTitle">{NAME}</div>
    <div class="strikePrice productPrice">Our Price: {PRICE}</div>
    <div class=" productsalePrice">On Sale: {SALEPRICE}</div>
</div>
```

An example of the image and link HTML with variables that are filled by the email service provider are shown below. The variables are customer ID, product IDs, attribute IDs, start position and result type. The variables are shown in {curly brackets}, and introduced by %4T with two letters, e.g. cu, pi, at, sp, and rt, respectively. The %4T should not occur since % is supposed to be followed by two hexadecimal characters in URLs, and T is not a hexadecimal character.

```
<div>
<a href="http:/email.4-tell.net/boost/l/627dcf3a-ecdd-48a4-93e8-d1a1fbf8cb1b
%4Tcu{CUSTOMERID}%4Tpi{PRODUCTIDS}%4Tat{ATT1IDS}%4Tsp{STARTPOSITION
}
%4Trt{RESULTTYPE}.html" target="_blank">
<img src="http:/email.4-tell.net/boost/i/627dcf3a-ecdd-48a4-93e8-d1a1fbf8cb1b
%4Tcu{CUSTOMERID}%4Tpi{PRODUCTIDS}%4Tat{ATT1IDS}%4Tsp{STARTPOSITION
}
%4Trt{RESULTTYPE}.jpg">
</a>
</div>
```

An example of the HTML code sent in the email and received by our dynamic image and redirection server is below. In this case, all of the variables have been filled in.

```
<div>
<a href="http:/email.4-tell.net/boost/l/627dcf3a-ecdd-48a4-93e8-d1a1fbf8cb1b
%4Tcu1234%4Tpi1,2,3%4Tat23%4Tsp1%4Trt0.html" target="_blank">
<img src="http:/email.4-tell.net/boost/i/627dcf3a-ecdd-48a4-93e8-d1a1fbf8cb1b
%4Tcu1234%4Tpi3%4Tat23%4Tsp1%4Trt0.jpg">
</a>
</div>
```

CONCLUDING REMARKS

The foregoing descriptions of the preferred embodiments of the invention have been presented to teach those skilled in the art how to best utilize the invention. To provide a comprehensive disclosure without unduly lengthening the specification, the applicants incorporate by reference the patents, patent applications and other documents referenced above. Many modifications and variations are possible in light of the above teachings, including incorporated-by-reference patents, patent applications and other documents. For example, methods to determine related items can be used to determine similar items, and vice-versa.

What is claimed is:

1. A computer-implemented method comprising:
   (a) identifying a target entry in a second array having entries comprising items, wherein a first set of entries in a first array are linked to the target entry in the second array, the first array having entries comprising users;
   (b) finding related entries in the second array that have similarities to the target entry in the second array using a correlation;
   (c) finding linked entries in the first array that are linked to the related entries found in the second array and not in the first set of entries in the first array;
   (d) using the linked entries found in the first array that are linked to the related entries found in the second array and not in the first set of entries in the first array as a second set of entries in the first array that are related to the first set of entries in the first array, without directly calculating entry-to-entry similarities between entries in the first array, wherein steps (a) through (d) are computationally complex and are performed on a non-real-time train component running on a first computing device;
   (e) communicating information regarding the second set of entries in the first array that are related to the first set of entries in the first array from the first computing device to a second computing device; and
   (f) thereafter communicating electronically from a real-time recommend component optimized for real-time response running on the second computing device to one or more third computing devices associated with one or more users associated with the second set of entries in the first array regarding an item associated with the target entry in the second array, thereby separating the computational complexity of steps (a) through (d) from step (f) performed on the real-time recommend component, wherein the first computing device is separate from the second computing device and the first and second computing devices are separate from the one or more third computing devices, and the electronic communication from the real-time recommend component to the one or more third computing devices occurs in real-time.

2. The method of claim 1 wherein the correlation has a correlation value that is based on a number of entries in the first array linked to both the target entry in the second array and one of the related entries in the second array in a time period.

3. The method of claim 2 wherein the target entry in the second array and related entries in the second array have attributes, and the relationship of the attributes of the target entry in the second array and each of the related entries in the second array, wherein the relationship between a pair of attributes is calculated from entries in the first array linked with a first entry in the second array containing a first attribute and a second entry in the second array containing a second attribute.

4. The method of claim 2 further comprising calculating a likelihood for each linked entry found in the first array from step (d) of claim 1 with the following steps,
   a. determining each related entry in the second array that is linked to the entry in the first array, and the corresponding correlation value between each related entry and a target entry in the second array;
   b. finding a largest corresponding correlation value; and
   c. combining the largest corresponding correlation value and a sum of the remaining corresponding correlation values, such that the likelihood is equal to or greater than the largest corresponding correlation value.

5. The method of claim 1 wherein:
   the target entry in the second array comprises a target item;
   one of the related entries in the second array comprises a related item; and a user and an item may be linked by a user interaction with the item.

6. The method of claim 5 wherein the correlation results in an item-to-item likelihood that the user will interact with an item related to the target item based on the user's previous interaction with the target item.

7. The method of claim 6 wherein the target item and the related item have attributes, and the item-to-item likelihood is based on a number of users that interacted with the related item and a number of attributes that the target item and related item have in common.

8. The method of claim 6 wherein the target item and the related item have attributes, the item-to-item likelihood is based on a number of users that interacted with the related item and the relationship of the attributes of the target item and the related item, wherein the relationship between a pair of attributes is calculated by users interacting with a first item containing a first attribute and a second item containing a second attribute.

9. The method of claim 6 further comprising calculating a user-to-item likelihood for each user with the following steps,
   a. determining each related item that the user previously interacted with during a time period, and the corresponding item-to-item likelihoods between each related item and the target item;
   b. finding a largest corresponding item-to-item likelihood; and
   c. combining the largest corresponding item-to-item likelihood and a sum of the remaining corresponding item-to-item likelihoods, such that the user-to-item likelihood is equal to or greater than the largest corresponding item-to-item likelihood.

10. The method of claim 5 wherein the user interaction includes viewing the item, buying the item, or both.

11. The method of claim 5 wherein the item is content on a website, products on the website or both.

* * * * *